(12) United States Patent
Dey et al.

(10) Patent No.: US 11,372,530 B2
(45) Date of Patent: Jun. 28, 2022

(54) USING A WIRELESS MOBILE DEVICE AND PHOTOGRAPHIC IMAGE OF A BUILDING SPACE TO COMMISSION AND OPERATE DEVICES SERVICING THE BUILDING SPACE

(71) Applicant: Ademco Inc., Golden Valley, MN (US)

(72) Inventors: Soumitra Dey, Bangalore (IN); Bhavesh Gupta, Surat (IN); Sheeladitya Karmakar, Bangalore (IN); Jegathesan Shennakesavan, Bangalore (IN); Gerard Jorna, Eton (GB); Jayalaxmi Telang, Bangalore (IN); Dayasagar Peddinti, Bangalore (IN); Jimmy El-Hajj, Dubai (AE); Manikandan Sivasubramanian, Bangalore (IN)

(73) Assignee: Ademco Inc., Golden Valley, MN (US)

( * ) Notice: Subject to any disclaimer, the term of this patent is extended or adjusted under 35 U.S.C. 154(b) by 112 days.

(21) Appl. No.: 16/138,307

(22) Filed: Sep. 21, 2018

(65) Prior Publication Data

US 2019/0087076 A1 Mar. 21, 2019

Related U.S. Application Data

(60) Provisional application No. 62/561,605, filed on Sep. 21, 2017.

(51) Int. Cl.
| | |
|---|---|
| *G06F 3/04847* | (2022.01) |
| *G06F 3/04817* | (2022.01) |
| *G06F 3/0486* | (2013.01) |
| *G06F 3/04883* | (2022.01) |
| *G06F 3/0485* | (2022.01) |
| *H04L 12/28* | (2006.01) |
| *G06F 3/04845* | (2022.01) |

(Continued)

(52) U.S. Cl.
CPC ........ *G06F 3/04847* (2013.01); *G06F 3/0485* (2013.01); *G06F 3/0486* (2013.01); *G06F 3/04817* (2013.01); *G06F 3/04845* (2013.01); *G06F 3/04883* (2013.01); *H04L 12/2818* (2013.01); *H04M 1/72415* (2021.01); *H04N 5/23293* (2013.01); *G06F 2203/04806* (2013.01); *H04M 2250/22* (2013.01); *H04N 5/23238* (2013.01)

(58) Field of Classification Search
None
See application file for complete search history.

(56) References Cited

U.S. PATENT DOCUMENTS

| | | | | |
|---|---|---|---|---|
| 5,086,385 A * | 2/1992 | Launey | ................. | G08B 25/14 700/83 |
| 7,702,421 B2 * | 4/2010 | Sullivan | ................. | G05B 15/02 700/276 |

(Continued)

*Primary Examiner* — Henry Orr
(74) *Attorney, Agent, or Firm* — Shumaker & Sieffert, P.A.

(57) ABSTRACT

One or more screens may be displayed on a touch screen of a wireless mobile device to solicit commissioning information from the user, including uploading a photograph of a room. The photograph may be displayed on the touch screen along with a set of icons corresponding to devices in the room. Individual icons may be moved onto the photograph to locations corresponding to the actual devices. The icons can be used to configure and operate the corresponding devices.

20 Claims, 28 Drawing Sheets

(51) Int. Cl.
*H04N 5/232* (2006.01)
*H04M 1/72415* (2021.01)

(56) References Cited

U.S. PATENT DOCUMENTS

| | | | | |
|---|---|---|---|---|
| 8,032,254 | B2 * | 10/2011 | Amundson | G05B 13/02 700/276 |
| 8,196,185 | B2 * | 6/2012 | Geadelmann | G05B 15/02 726/4 |
| 2009/0057426 | A1 * | 3/2009 | Sullivan | G05B 19/0421 236/51 |
| 2009/0302782 | A1 * | 12/2009 | Smith | H05B 47/10 315/297 |
| 2010/0145479 | A1 * | 6/2010 | Griffiths | G01D 21/00 700/17 |
| 2010/0251266 | A1 * | 9/2010 | Majewski | G06F 3/0486 719/323 |
| 2013/0173064 | A1 * | 7/2013 | Fadell | G06F 3/011 700/276 |
| 2013/0326425 | A1 * | 12/2013 | Forstall | G01C 21/3638 715/851 |
| 2014/0005809 | A1 * | 1/2014 | Frei | H04L 12/2818 700/90 |
| 2014/0298217 | A1 * | 10/2014 | Lehtiniemi | G06Q 10/06 715/765 |
| 2014/0358285 | A1 * | 12/2014 | Aggarwal | H04L 12/6418 700/275 |
| 2015/0127174 | A1 * | 5/2015 | Quam | H04L 67/10 700/276 |
| 2015/0256665 | A1 * | 9/2015 | Pera | H04L 12/2816 455/420 |
| 2016/0085412 | A1 * | 3/2016 | Meganathan | G08C 17/00 715/739 |
| 2016/0085431 | A1 * | 3/2016 | Kim | G06F 3/04817 715/735 |
| 2016/0335100 | A1 * | 11/2016 | Pyle | G06F 9/44505 |
| 2016/0335731 | A1 * | 11/2016 | Hall | G06Q 50/163 |
| 2017/0090441 | A1 * | 3/2017 | Schmitt | G05B 15/02 |
| 2017/0103644 | A1 * | 4/2017 | Chauhan | G08B 25/001 |

\* cited by examiner

USING A WIRELESS MOBILE DEVICE AND PHOTOGRAPHIC IMAGE OF A BUILDING SPACE TO COMMISSION AND OPERATE DEVICES SERVICING THE BUILDING SPACE

RELATED APPLICATIONS

This application claims the benefit of U.S. Provisional Application Ser. No. 62/561,605, filed Sep. 21, 2017 entitled SMART HOME INTERFACE AND METHODS, which application is incorporated by reference herein in its entirety.

TECHNICAL FIELD

The present disclosure generally pertains to building control systems, and more particularly to using a wireless mobile device to commission and operate a building control system.

BACKGROUND

Building control systems are often used to control the operation of buildings. Building control systems can include, for example, Heating, Ventilation, and/or Air Conditioning (HVAC) systems, security systems, lighting control systems, music systems, operable window covering systems, and other systems.

SUMMARY

The disclosure relates generally to building control systems and to using wireless mobile devices in commissioning and controlling building control systems. An example of the disclosure may be found in a non-transitory, computer-readable medium containing program instructions for facilitating a user of a wireless mobile device in commissioning a plurality of devices operably coupled to a building control system of a property including a building controller. Execution of the program instructions by one or more processors of the wireless mobile device causes the wireless mobile device to carry out the steps of providing one or more screens on a touch screen of the wireless mobile device to solicit commissioning information from the user, allowing the user to provide commissioning information by uploading a photograph of a particular room within the property, displaying the uploaded photograph on the touch screen of the wireless mobile device, displaying a set of icons on the touch screen of the wireless mobile device, the set of icons representing devices within the particular room shown in the displayed photograph, allowing the user to move individual icons from the set of icons onto the uploaded photograph, where each individual icon can be moved to a location proximate a physical location of the corresponding device in the uploaded photograph, thereby allowing the location of each individual icon to help identify the corresponding device, and communicating with the building controller in order to communicate the commissioning information to the building controller so that the building controller can configure operation of the plurality of devices operably coupled to the building controller.

Another example of the disclosure is a method of using a wireless mobile device to display multiple views of a building space, the wireless mobile device including a touch screen display. The method includes detecting a screen size of the touch screen display. When the screen size of the touch screen display is below a predetermined threshold, the method includes arranging each of a plurality of building space images in a vertical stack, and allowing a user to scroll vertically to change a selected building space image that is shown at the top of the vertical stack. When the screen size of the touch screen is at or above the predetermined threshold, the method includes arranging each of the plurality of building space images in a single view, with a selected building space image shown in the middle and other building space images in designated slots on either side of the selected building space, and allowing the user to scroll through to change the selected building space.

Another example of the disclosure is a method of using a wireless mobile device to configure operation of a plurality of connected devices within a building space, the building space having a building controller operating one or more systems within the building space, the wireless mobile device including a touch screen display. The method includes displaying one or more screens on the touch screen that solicit entry of building space information, accepting entry of building space information via the touch screen, including a photographic image of the building space, displaying the photographic image of the building space on the touch screen along with a set of icons representing one or more connected devices that are servicing the building space that is represented by the photographic image, and allowing a user to drag and drop individual icons from the set of icons onto the photographic image of the building space.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
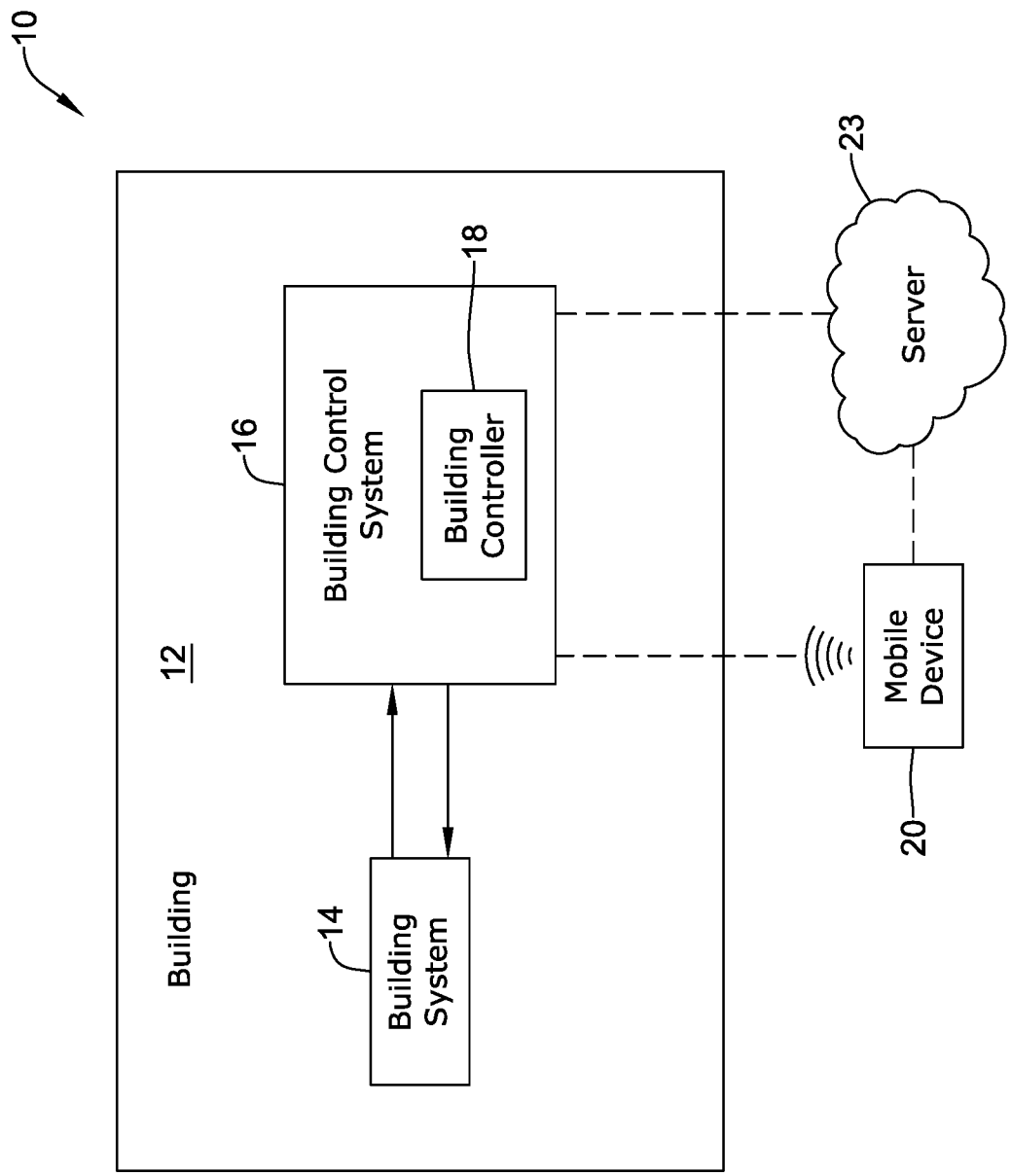
FIG. 1 is a schematic block diagram of an illustrative building system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The disclosure pertains generally to an easy to use platform for complex property commissioning, sometimes using mobile devices, such as tablets and smartphones. The platform may be used, for example, in setting up desired settings for a variety of different home or building devices. Examples include lighting, curtains and HVAC (heating ventilation and air conditioning). In some instances, the platform may include a software program that is being executed on a wireless mobile device. The platform may be used to initially set up desired settings. The platform may also be used to change or adjust settings on a day to day or hour to hour basis. For example, a user may want to turn some of their lights up or down. A user may wish to open or close their curtains or blinds. A user may want to adjust a temperature in one or more rooms of their home.

In some cases, an installer may use the platform to initially set up the residential or commercial property, and once set up, a homeowner, a tenant or other user may use the platform, sometimes running on a mobile device, building control wall module, or other device, to control their property. In some cases, a common software platform may be provided that provides a platform for the installer as well as a user interface for the user to control the devices defined for the property. The installer and the homeowner may each be visually guided through different steps/screens.

In one example, installer commissioning can involve a number of distinct steps, with flexibility to navigate freely between the different steps. The illustrative steps may include, for example, Create Users, Create Property, Create Rooms, Add Devices, Device Settings, Create Moods and/or General Settings. When creating users, roles may include homeowners and other residents, staff members (if they exist), as well as professionals such as the installer. Each role may be have access to different functions/screens of the platform.

In some cases, the installer may first create the users for the property. After creating the users, the property detailed may be defined. In some cases, defining the property may include uploading an image of a floor plan of the property, followed by creating rooms for the property. In some cases, the devices in a particular room may be wired to a wiring bus for that particular room, which in turn is coupled to a room controller. When creating a particular room, the platform may in some cases provide a list of all connected devices within the room by noting the devices that are connected to the room controller for that room. Such devices may include, for example, lights, curtains, HVAC controls, televisions, etc., that are wired to the wiring bus of that particular room.

When creating rooms, the installer may have the option of uploading images for one or more of the rooms within the property. In some cases, the installer may use the camera feature of the mobile device that is executing the platform to take pictures of the rooms. In some cases, the pictures may be panoramic pictures to capture the entire room.

Once the property and the rooms within the property have been created, the installer can add devices to a particular room, for example. This may include adding a thermostat, adding lighting fixtures, curtains and blinds, and the like, that correspond to the connected devices of that particular room. In some cases, the installer may select icons representing each of the connected devices in the room, and drag the icons into position on the image of the room. The icons may be placed on the image at locations that correspond to the actual physical locations of the corresponding devices in the room. In some cases, this makes it easier to intuitively find and then control the various connected devices in the room.

In some cases, since the platform is running in an application on a tablet or smartphone, users can navigate the platform using native gestures that they are already familiar with. For example, "pinch and spread" can be used to zoom in on an image. A user can swipe left or right to pan left or right, or navigate between screens. A user can tap on a button to open a screen represented by that button. These are just examples. Once the connected devices have been added, the installer can adjust settings of the added devices. This may include, for example, setting desired temperature settings, and lighting levels and/or lighting colors. The platform may include a default mode in which floor plans and room images are not utilized.

The platform may also enable moods to be created. A mood may be a room mood, or may be a property-wide mood. A mood is a collection of device settings that can be selected and set automatically. For example, a mood may be labeled SLEEP, and for a room mood may include setting the temperature of the room to a desired sleep temperature, and turning off the lights in the room. For a property mood, SLEEP may also include setting the temperature in non-sleeping rooms to an energy savings temperature, turning off most of the inside lights in the property but perhaps leave a night light on in a hallway or restroom, turning on some of the outside lights for security purposes, and turning on the security system, for example.

The platform may also enable general settings to be adjusted and/or set. These can include, for example, a language selection, activation of a diagnostic test report, selection of one or more screen skins and/or other system information. Once a property has been commissioned, the configurations for that property may be saved and used as a template for commissioning other similar properties, if desired.

The disclosure relates to an easy to use platform that can be used on a mobile device when commissioning properties that have a large number of configurable elements. The platform can also be used subsequently in controlling the configurable elements, and in some cases may be used in modifying one or more settings in a previously completed property configuration. Configurable elements may include, for example, a variety of both wireless and wired devices, such as lights, curtains and blinds and the like. HVAC components may also be configurable using the platform. The platform described herein is designed to run on a mobile device such as a tablet or a smart phone and is meant to be intuitive to use. It is intended for the installer and/or other user to be able to use the platform without much if any instruction.

An advantage to designing a platform to run on a mobile device is that modern mobile devices can be easily carried around a property and provide a rich user interface that is familiar to most users. For example, native gestures that the user or installer are already familiar with, such as "pinch and spread" to zoom in and out, "drag and drop", "tap" and "double tap" for making selections, etc., can be used to make the platform intuitive to navigate and use. In some cases, for example, "pinch and spread" may be used to zoom in or zoom out of a property view. Once zoomed in a particular amount, in some cases the platform can snap to a zoom level. A double tap may cause the platform to zoom to a highest level view available. A user can tap on a room button (when viewing a floor plan, for example) to open a room view for that room. A user may tap on a floor plan or pinch in the room view to cause the platform to return to a floor plan view. In some cases, a user can swipe up or down to navigate across floors or between rooms. In some instances, a user can swipe up or down to navigate between rooms on a particular floor. In some cases, a user may swipe left and right in order to navigate across a floor, or between floors, or to navigate across a room, or to navigate between rooms. The platform provides an intuitive, easy to use visual navigation through the property.

In some cases, floor plans may include room buttons that may be used for accessing each room on that floor plan. In some instances, a particular room button may be placed on the floor plan in accordance with where that particular room is on the floor plan. This can make it easier and faster to navigate between rooms, for example. In some cases, the controls that are displayed in combination with a particular room or an area of a particular room (if the room is large) may be contextual. For example, if the displayed portion of a room only includes several configurable lamps, but no other devices, the platform will only display controls that are applicable to configuring or controlling those lamps. If a displayed portion of a room includes a wall of windows, the platform will display controls for configuring or operating the operable blinds and/or curtains that correspond to those windows, if any. If a displayed portion of a room includes a thermostat or other HVAC controller, the platform may display controls for configuring or operating the thermostat or other HVAC controller, as desired.

In some cases, the platform may be configured to be able to learn user preferences over time. This may mean, for example, that the platform will show more frequently used rooms at a different zoom level than other rooms that are less frequently used. Early on, while the platform is still learning user preferences, the platform may for example give display preference to rooms that have more devices. In some cases, this removes clutter from the floor plan view but also enhances the user experience. In some cases, the platform is configured to enable an installer or other user to save a completed configuration as a template that can subsequently be used in configuring a similar property in the future. In some cases, this can be a substantial time saver.

FIG. 1 is a schematic block diagram of an illustrative system 10 in which the aforementioned platform may be used. As illustrated, the system 10 includes a building 12, which may be a residential structure such as a house, a condominium or an apartment. In some cases, the building 12 may instead represent a commercial structure such as a retail store or an office building, for example. The building 12 may represent a single structure, or in some cases the building 12 may represent two or more distinct structures that together encompass a campus, for example. The building 12 includes a building system 14. In general, the building 12 may include a plurality of building systems 14, although only one is illustrated. For example, the building system 14 may represent a lighting system that includes a variety of different lighting elements. The building system 14 may represent a security system that includes a variety of different security elements, such as motion sensors, noise or glass break sensors and the like. The building system 14 may represent an HVAC system, and may include any number of HVAC components such as a furnace, an air conditioner, a ventilation unit, a humidifier, a dehumidifier, a heat pump, and the like. These are just examples. In some cases, the building system 14 may represent a combination of two or more of these systems.

A building control system 16 may be operationally coupled with the building system 14 in order to provide operational instructions to the building system 14 as well as to receive information such as sensor inputs from the building system 14. The building control system 16 includes a building controller 18 that processes information received from the building system 14 and determines instructions to be sent to the building system 14. In some cases, the building control system 16 may be located within the building 12 that includes the building system 14. In some instances, the building control system 16 or at least portions thereof may be disposed at a location remote from the building 12.

In some cases, a wireless mobile device 20 may be used to communicate with the building control system 16. The wireless mobile device 20 may display information related to operation of the building control system 16, for example, allowing a user of the wireless mobile device 20 to solicit additional information from the building system 14 and the building control system 16, and/or to provide instructions to the building control system 16 pertaining to operation of the building system 14. In some cases, the wireless mobile device 20 may be configured to communicate directly with the building control system 16. The wireless mobile device 20 may communicate with the building control system 16 via WiFi or Bluetooth, for example. In some instances, there may be a router or modem within a communication chain between the wireless mobile device 20 and the building control system 16. In some cases, the wireless mobile device 20 may instead communicate with a server 23, which may be a cloud-based server, and the server 23 may communicate with the building control system 16.

Figure 2:
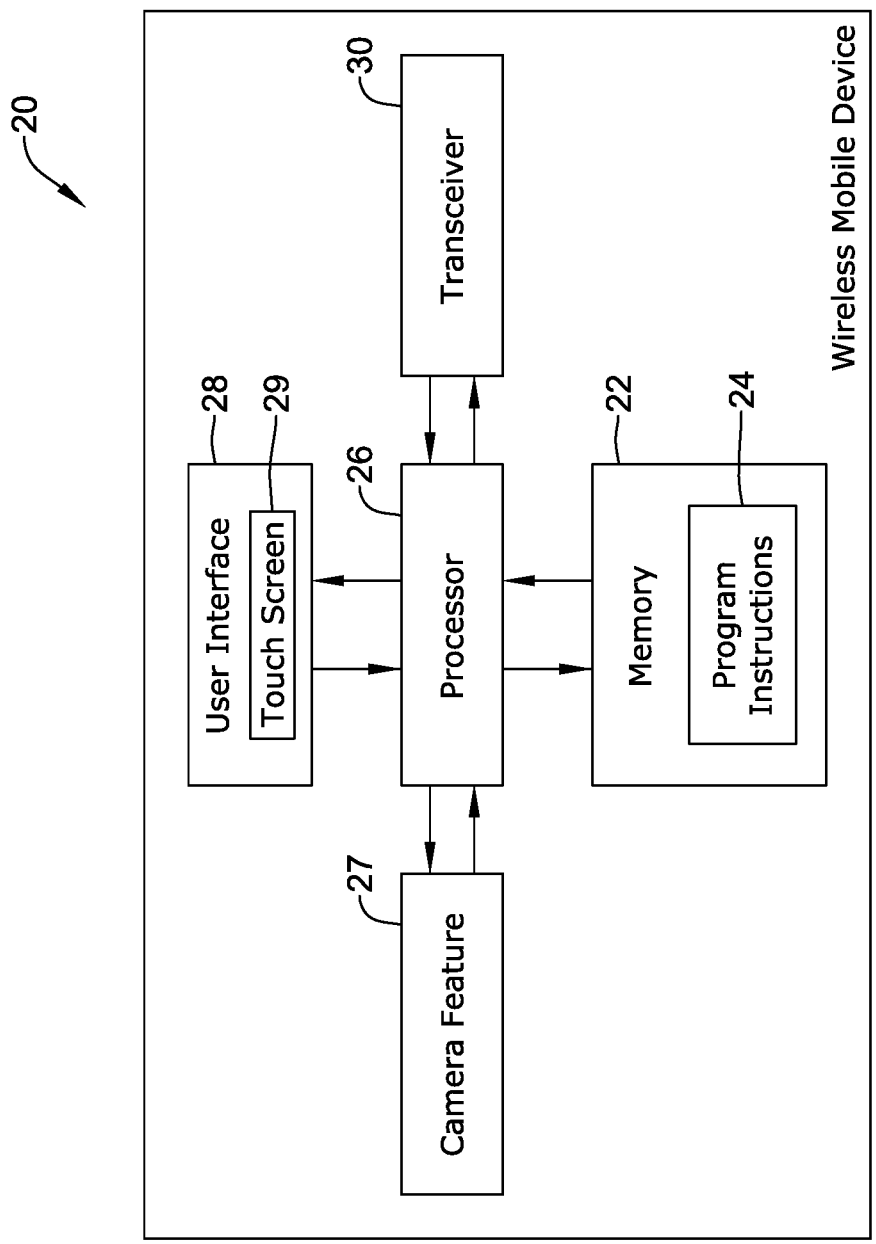
FIG. 2 is a schematic block diagram of an illustrative wireless mobile device usable in the illustrative building system of FIG. 1.

FIG. 2 is a schematic block diagram of the wireless mobile device 20. It should be noted that the wireless mobile device 20 may represent any currently available or future models of portable wireless devices such as but not limited to smart phones and tablets. In some cases, smart phones may be delineated into smaller size smart phones and larger size smart phones, sometimes referred to as phablets. The illustrative wireless mobile device 20 includes a memory 22 that may be used to store a variety of data such as contact information. The memory 22 may be configured to store program instructions 24. The wireless mobile device 20 may include a camera feature 27 that can be used by the user to take photos. As will be discussed, the camera feature 27 may be used to take photographs, such as panoramic photographs, that may be used in the commissioning process. The program instructions 24 may include a variety of different applications, for example, including but not limited to the application program that defines and provides the present platform or at least part of the present platform.

The program instructions 24 may be executed by a processor 26 of the wireless mobile device 20. While one processor 26 is illustrated, it will be appreciated that the wireless mobile device 20 may include any number of processors. The wireless mobile device 20 includes a user interface 28 that is or otherwise includes a touch screen display 29, that enables the processor 26 to display information to the user as well as to solicit and receive information from the user, including information requested or provided by the program instructions 24 as they are executed. A transceiver 30 enables the wireless mobile device 20 to communicate. In some cases, the transceiver 30 may represent a plurality of different transceivers enabling communication via cellular communication, WiFi, Bluetooth and the like. In some cases, one or more of the transceivers 30 may be manifested within circuitry (such as an integrated circuit chip) providing the functionality of the processor 26. These are just examples.

Figure 3:
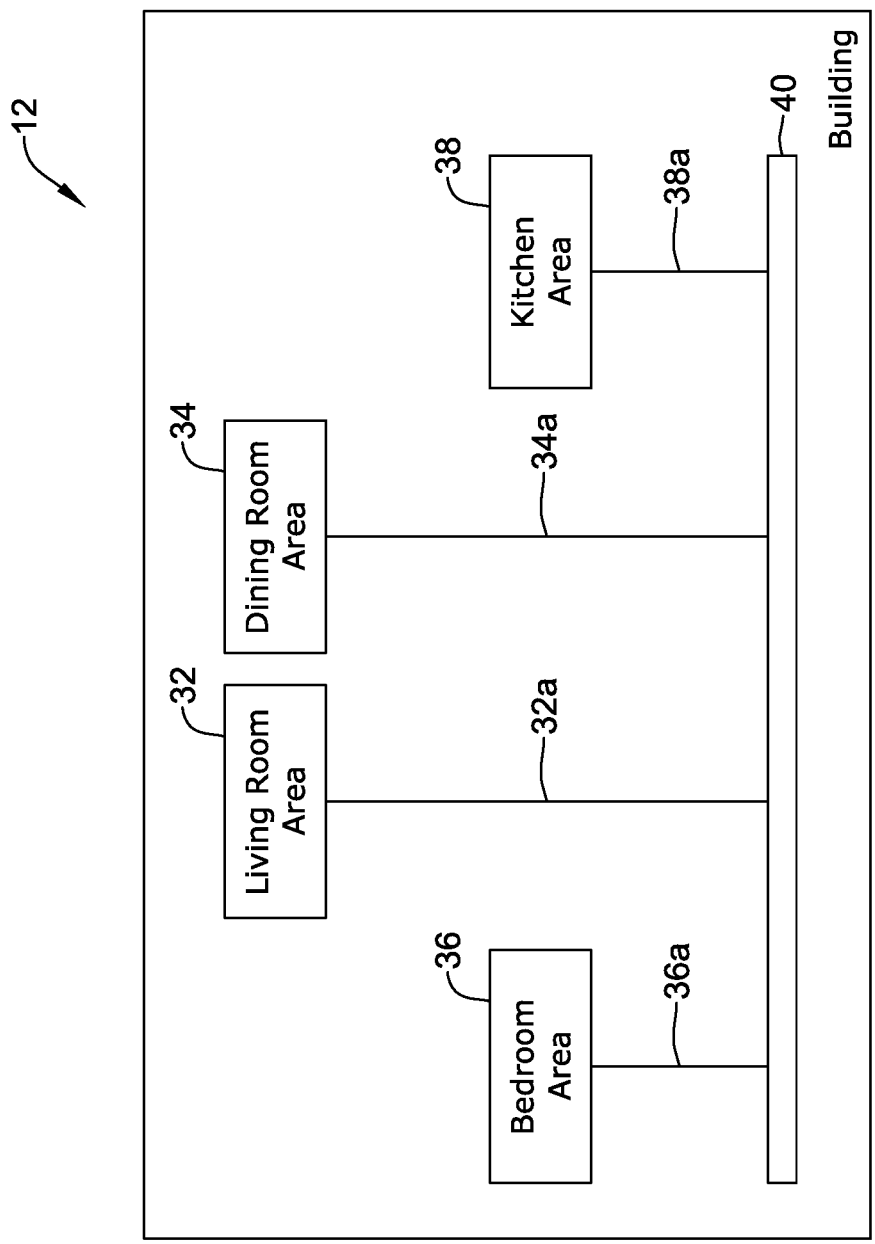
FIG. 3 is a schematic block diagram of a building forming a part of the building system of FIG. 1.

With brief reference to FIG. 1, it will be appreciated that the building 12 may be divided into a plurality of spaces. FIG. 3 is a schematic block diagram of the building 12, showing an example in which the building 12 is a residential space such as a house or a condominium. As illustrated, the building 12 is divided into a living room area 32, a dining room area 34, a bedroom area 36 and a kitchen area 38. It will be appreciated that these are merely illustrative, as the building 12 may be divided into or may otherwise include any number of different rooms, regions, areas, spaces and the like. In some cases, the building 12 may be divided into a number of distinct rooms, with walls and doors delineating the distinct rooms. The building 12 may have more of an open-concept, in which areas are open to each other. For example, the kitchen area 38 may be open to the living room area 32 as well as the dining room area 34. These are just examples.

It will be appreciated that at least some of the individual areas, rooms or spaces within the building 12 may include controllable devices such as but not limited to lighting devices, security devices, music devices, HVAC devices, operable window treatments and the like. In the example shown, the building 12 includes a network 40 that serves to operably connect all of the controllable devices with the building control system 16 (FIG. 1). In some cases, as illustrated, the network 40 may be a hard wired network. The network 40, or at least portions thereof, may instead be wireless. Any variety of wireless communication protocol may be used, including for example, WiFi, Bluetooth, Zigbee and Redlink. In some cases, devices within the living room area 32 may be connected to the network 40 via a connection 32a. Devices within the dining room area 34 may be connected to the network 40 via a connection 34a. Devices within the bedroom area 36 may be connected to the network 40 via a connection 36a. Devices within the kitchen area 38 may be connected to the network 40 via a connection 38a. It will be appreciated that the connections 32a, 34a, 36a, and 38a may represent wired or wireless communication protocols. In some cases, each room may have a corresponding room controller that provides the corresponding room connection to the network 40. In some cases, each room controller may define a sub-network that connects to the various connected devices in the corresponding room.

Figure 4:
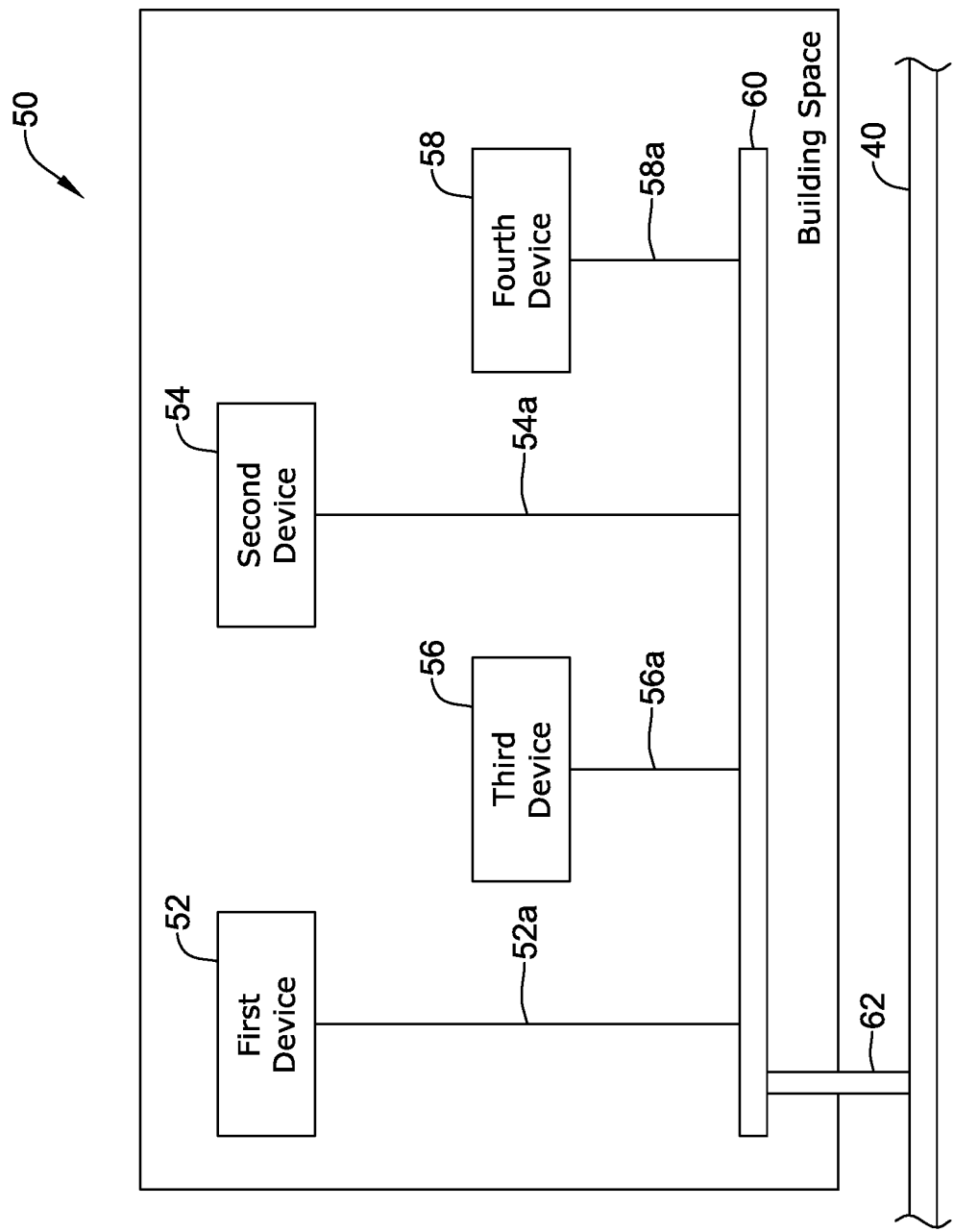
FIG. 4 is a schematic block diagram of a portion of the building of FIG. 2.

FIG. 4 is a schematic block diagram of a building space 50 that may be considered as representing one of the living room area 32, the dining room area 34, the bedroom area 36, the kitchen area 38 or any other room, space, area or subdivision of the building 12. As schematically illustrated, the building space 50 includes a first device 52, a second device 54, a third device 56 and a fourth device 58. Each of the first device 52, the second device 54, the third device 56 and the fourth device 58 may schematically represent any number of devices, and any type of device. For example, the first device 52 may represent a lighting element while the second device 54 may represent a security sensor, for example. In the example shown, the building space 50 includes a sub-network 60 that may be operably coupled with the building network 40 via a connection 62. It will be appreciated that the connection 62 may represent any of the connections 32a, 34a, 36a, 38a shown in FIG. 3, for example. The connections shown may be wired connections, wireless connections or a combination of wired and wireless. When the devices 52-58 are devices within a common room, the sub-network may be hosted by a room controller.

Figure 5:
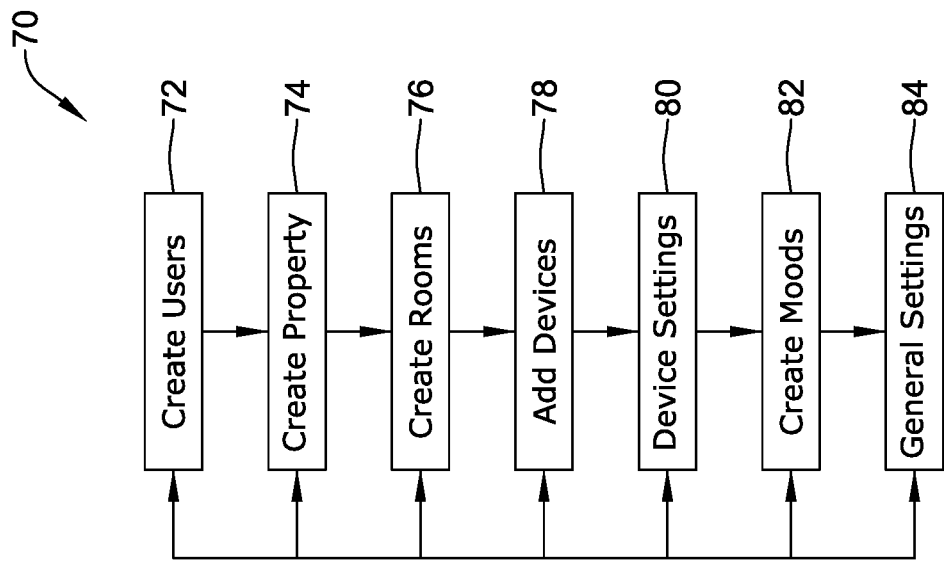
FIG. 5 is a schematic block diagram of an illustrative commissioning process.

FIG. 5 is a schematic block diagram showing a commissioning process 70 that may be carried by the platform using the wireless mobile device 20 (FIG. 1). The illustrative commissioning process 70 may be considered as being divided into a total of seven steps. While in some cases a user may move back and forth between these seven steps, the platform is designed to bring the user through the process in an intuitive, logical manner. In Step One, referenced at block 72, the platform enables the installer or other user to create users. In Step Two, referenced at block 74, the platform enables the installer or other user to create the property. In Step Three, referenced at block 76, the platform enables the installer or other user to create rooms within the property. In Step Four, referenced at block 78, the platform enables the installer or other user to add devices within each room. In Step Five, referenced at block 80, the platform enables the installer or other user to set device settings for each of the devices within each room. In Step Six, referenced at block 82, the platform enables the installer or other user to create moods. In Step Seven, referenced at block 84, the platform enables the installer or other user to address general settings. Each of these Steps will be addressed in turn.

As referenced at block 72, and in Step One, the platform permits the installer or other user to define each of the users that may have access to the system. Each of the users may have a defined role, and may have a corresponding set of rules governing the type and level of access that each user may have. Creating a user includes providing an identification of the user. In some cases, defining a particular user may include uploading a photograph of the user. The user's profile may then be created, which may include definitions of the types and/or levels of system access that particular user may have. It will be appreciated that different users may have different types and levels of access. For example, the installer may have full rights to access all levels of the platform. In some cases, a technically proficient owner may have similar rights, while conventional users may have rights to operate the commissioned devices but may lack the rights to commission new devices. Other individuals may have different rights. For example, a particular user may be able to turn lights on or off but may not have rights to be able to adjust the color profile of the lights. A particular user may be able to open or close the curtains or blinds in a particular room or a particular set of rooms, while not having access to being able to control the curtains or blinds in certain other rooms of the property. These are just examples, and are not intended to be limiting in any manner or fashion.

Users may have one or more of a variety of different roles. The customer (typically the property owner) is one role. Other members of the household (spouse, children, frequent visitors) may be defined as another role, with perhaps diminished rights relative to the customer. Staff, such as household staff, may be defined as another role, with perhaps diminished rights relative to the other members of the household. A number of professionals may also have roles defined for them. Illustrative but non-limiting examples of such professionals may include a professional photographer, who may be charged with taking photographs of the property for uploading to the platform (as will be discussed). In some cases, a professional photographer may have rights to upload these photographs, but not have any other rights or access to the platform. Other professionals who may have roles defined for them, as users, may include a project developer, a designer, a sales person, an installer integrator and technicians and mechanics.

As referenced at block 74, and in Step Two, the illustrative platform permits the installer or other user to create the property. In some cases, this may involve uploading one or more floor plans, depending on the size of the building and whether the building has a single level or has multiple levels. The uploaded floor plan(s) may, for example, be engineering drawings or other professionally created floor plans. In some cases, the platform may be configured to provide one or more default floor plans that an installer or other user can utilize. In some cases, the platform may permit the installer or other user to customize the room labels on a default floor plan. In some cases, the platform may permit the installer or other user to add dimensions to a room on a default floor plan, and in some cases may permit the installer or other user to add, delete and move walls in order to make the generic or default floor plan closer in appearance to the actual property.

In some cases, uploaded floor plan images may be selected from a gallery of uploaded images. The installer or other user may be able to add names in order to better identify a particular floor plan, and in some cases may be able to add labels to the floor plans. In some cases, unneeded floor plans may be deleted from the gallery of uploaded images.

As referenced at block 76, and in Step Three, the illustrative platform permits the installer or other user to create rooms. In some cases, this may involve uploading one or more images of the rooms included on a particular floor plan or within the building (if multiple floor plans) and then selecting the appropriate image from a gallery of room images. In some cases, unneeded room images may be deleted. In some instances, room images may be edited, including but not limited to cropping a particular room image, or adding labels to a particular room image. In some cases, panoramic backdrops may also be used.

In some cases, the room images may be photographic images taken of the room, and thus the room images may include images of the devices within the room. In some instances, the room images may be cartoon-style drawings of the room, or in some cases may be engineering drawings of the room. In some cases, the platform may be configured to provide or otherwise utilize default room images. In some cases, the platform may enable the installer or other user to customize a default room image. In some cases, the platform may enable the installer or other user to select room icons from a library of room icons, or may enable the installer or other user to create room icons. The room icons may include a picture taken of the room. Once selected or created, a room icon for each room may be placed onto an appropriate location on an appropriate floor plan. In some cases, the room icons may be dragged and dropped into place on the floor plan. This is just an example, as other methods of placing the room icons may be employed.

As referenced at block 78, and in Step 4, the illustrative platform permits the installer or other user to add devices. In some cases, an installer or other user may select devices from a list of generic devices. In some instances, the platform provides a list of the configurable devices detected in the room. In some cases, for example, the configurable devices may be hard wired to a hub that communicates with the platform. In some cases, the hub may be a room controller. In some cases, at least some of the configurable devices may communicate wirelessly with the hub. In either case, the platform may be configured to display a ribbon that provides icons representing each of the configurable devices in the room. An installer or other use can drag and drop the individual icons from the ribbon onto the room image. In some cases, an icon representing a particular device within the room may be placed on top of that particular device within the room image. In some cases, by placing the device icons on the room image at locations corresponding to the actual physical location of the corresponding device, it can be easier for the installer or other user to keep track of which icon represents which device. In some cases, this can reduce or eliminate the need to place labels for each of the devices on the room image. In some cases, the platform may enable the installer or other user to test operation of each configurable device once added to the room image.

As referenced at block 80, and in Step Five, the illustrative platform permits the installer or other user to set or adjust device settings for each of the devices that were placed in the room during Step Four. If a particular device is a light source such as a lamp or a chandelier, the platform may permit the installer or other user to set a particular light color, as well as optionally setting a schedule by which the light source may be automatically turned on and off in accordance with time of day and day of the week, for example. If the device is a window covering such as curtains or blinds, the platform may permit the installer or other use to set parameters such as how far to open or how far to close the window covering. In some cases, the window coverings may be opened and closed in accordance with a schedule.

In some cases, the device may be a thermostat or other HVAC controller that regulates heating and/or air conditioning within the property being commissioned using the platform. In some cases, an HVAC controller may optionally control other HVAC systems, such as ventilation, humidification and dehumidification, and the like. The platform may permit the installer or other user to create schedules by which the HVAC system(s) of the property regulate temperature and humidity within the property. In some cases, this may include setting one or more different time periods for each day of the week, and setting desired heating and cooling temperature set points for each of the one or more different time periods. In some cases, this may also include selecting fan settings, humidification/dehumidification settings and the like.

In some cases, the device may be a security panel, or a particular security sensor such as a door sensor, a window sensor, a motion sensor, a glass breakage sensor or other noise sensor, a CO detector, a $CO_2$ detector and the like. In some cases, the platform may enable an installer or other user to adjust security sensors. For example, this may include defining what times of day the security system itself, or particular sensors, may be activated or deactivated. For example, the security system may be programmed via the platform to deactivate a front door sensor when the kids are expected to arrive home after school. This is just an example, there are a large number of security system parameters that may be programmed or adjusted using the platform.

As referenced at block 82, and in Step Six, the platform may permit the installer or other user to set moods. A mood may be considered as being a collection of particular settings to be employed in a room or combination of rooms when the mood is selected by the user, and/or on a particular day or at a particular time of day. Settings that may be included in a defined mood may include, for example, lighting settings, window covering settings, heating settings, cooling settings, ventilation settings, humidification/dehumidification settings, music settings, security system settings, and/or any other suitable setting. Lighting settings may include simply on or off settings, and/or the lighting system may be adjustable in intensity. In some cases, the lighting settings included within a mood may include a particular color of light. Moods may include security system settings. In some cases, if the devices within a particular room or combination of rooms includes a sound system, the mood settings may also include music settings such as playing particular music, playing a particular radio station, playing a particular music play list, as well as music volume settings. These are just examples.

As referenced at block 84, and in Step Seven, the platform may permit the installer or other user to set general settings. Rather than being applicable to specific devices within the property, general settings pertain more to overall system parameters. For example, a general setting that may be modified by the installer or other user is a language in which the platform communicates with the user. Overall appearance of the platform, such as display skins, may be modified by the installer or other user. Diagnostic tests may also be setup, accessed and/or performed via general settings. These are just examples.

Figure 6:
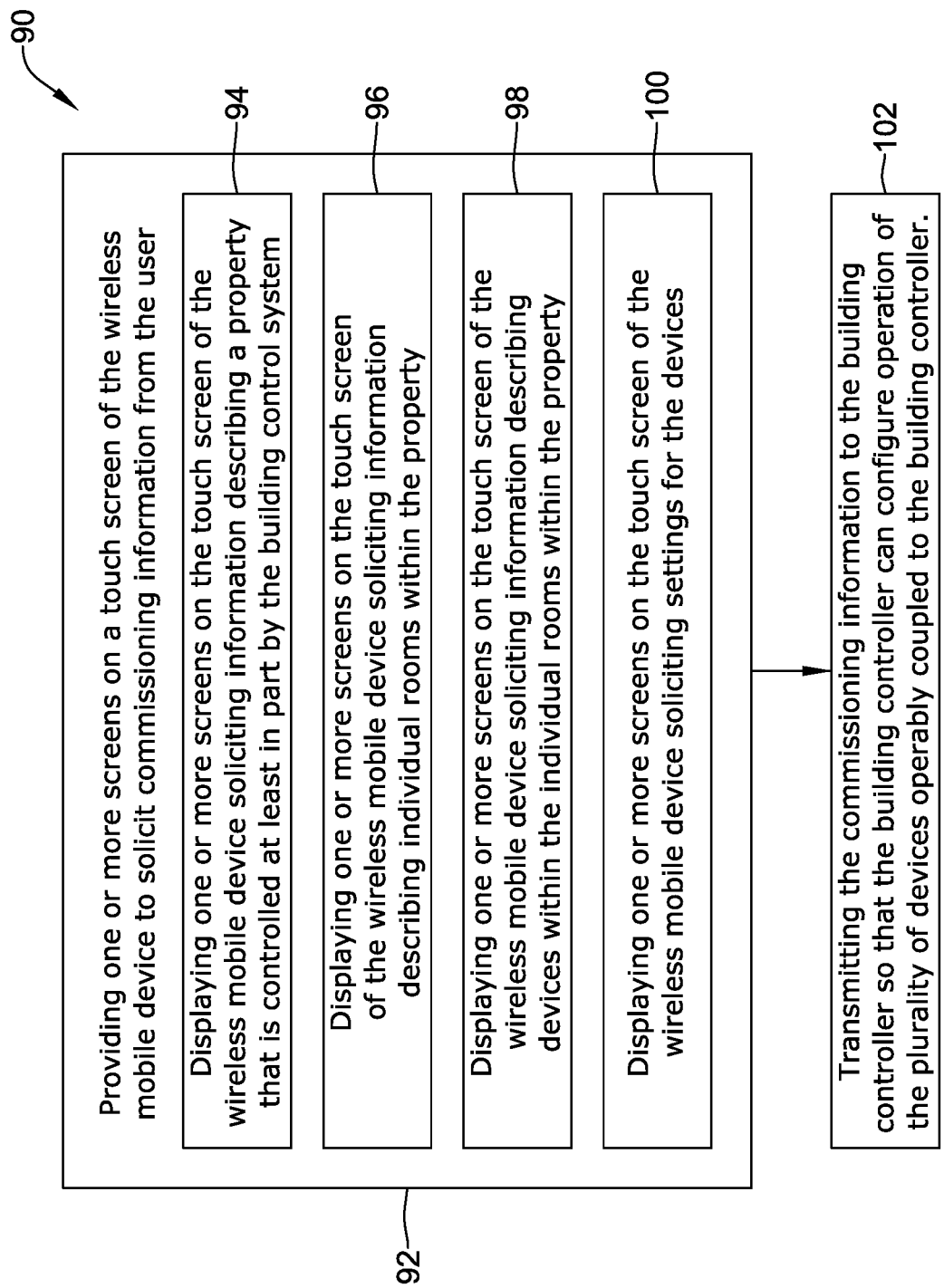
FIG. 6 is a flow diagram of an illustrative commissioning process.

FIG. 6 is a flow diagram showing an illustrative commissioning method 90 that may be carried out by the processor 26 of the wireless mobile device 20 executing the program instructions 24 stored in the memory 22. Execution of the program instructions 24 by the processor 26 may cause the wireless mobile device 20 to carry out a step of providing one or more screens on the touch screen 29 of the wireless mobile device 20 in order to solicit commissioning information from the user as indicated at block 92. In some cases, this may include, as noted at block 94, displaying one or more screens on the touch screen 29 of the wireless mobile device 20 soliciting information describing a property that is controlled at least in part by the building control system 16. In some cases, this may include requesting and obtaining floor plan images for the property.

As indicated at block 96, the illustrative commissioning method 90 may include displaying one or more screens on the touch screen 29 of the wireless mobile device 20 soliciting information describing individual rooms within the property. In some cases, this may include requesting and obtaining a room image for at least one room within the building. The room image may be a schematic illustration of the room. The room image may be a photographic image of the room, for example. In some cases the photographic image may be a panoramic image of the room.

As indicated at block 98, the illustrative commissioning method 90 may include displaying one or more screens on the touch screen 29 of the wireless mobile device 20 soliciting information describing devices within the individual rooms of the property. As indicated at block 100, this may include displaying one or more screens on the touch screen 29 of the wireless mobile device 20 soliciting settings for the devices. After soliciting commissioning information from the user, and as indicated at block 102, the commissioning information may be transmitted to the building controller 18 so that the building controller 18 can configure operation of the plurality of devices operably coupled to the building controller 18. In some cases, a user of the wireless mobile device 20 may be permitted to control in what order individual devices within a particular room are commissioned. In some instances, the user of the wireless mobile device 20 may be permitted to control in what order the individual rooms within a particular floor plan, or within a particular property, are commissioned.

In some cases, providing one or more screens on the touch screen 29 of the wireless mobile device 20 to solicit commissioning information from the user as noted at block 92 may include displaying one or more screens on the touch screen 29 soliciting information defining authorized users for the building control system 16. Authorized users for the building control system 16 may include, for example, household members and/or staff members living or working within the property. In some cases, authorized users for the building control system may include professionals installing, configuring and/or maintaining the building control system. In some cases, displaying one or more screens on the touch screen soliciting information defining authorized users for the building control system also includes soliciting information defining access rights for each of the authorized users, as the access rights may vary for at least some of the authorized users. For example, a parent may have access rights to adjust HVAC settings, adjust security system settings and the like while a child may only have access rights to adjust the lights, or turn an entertainment system on or off.

Figure 7:
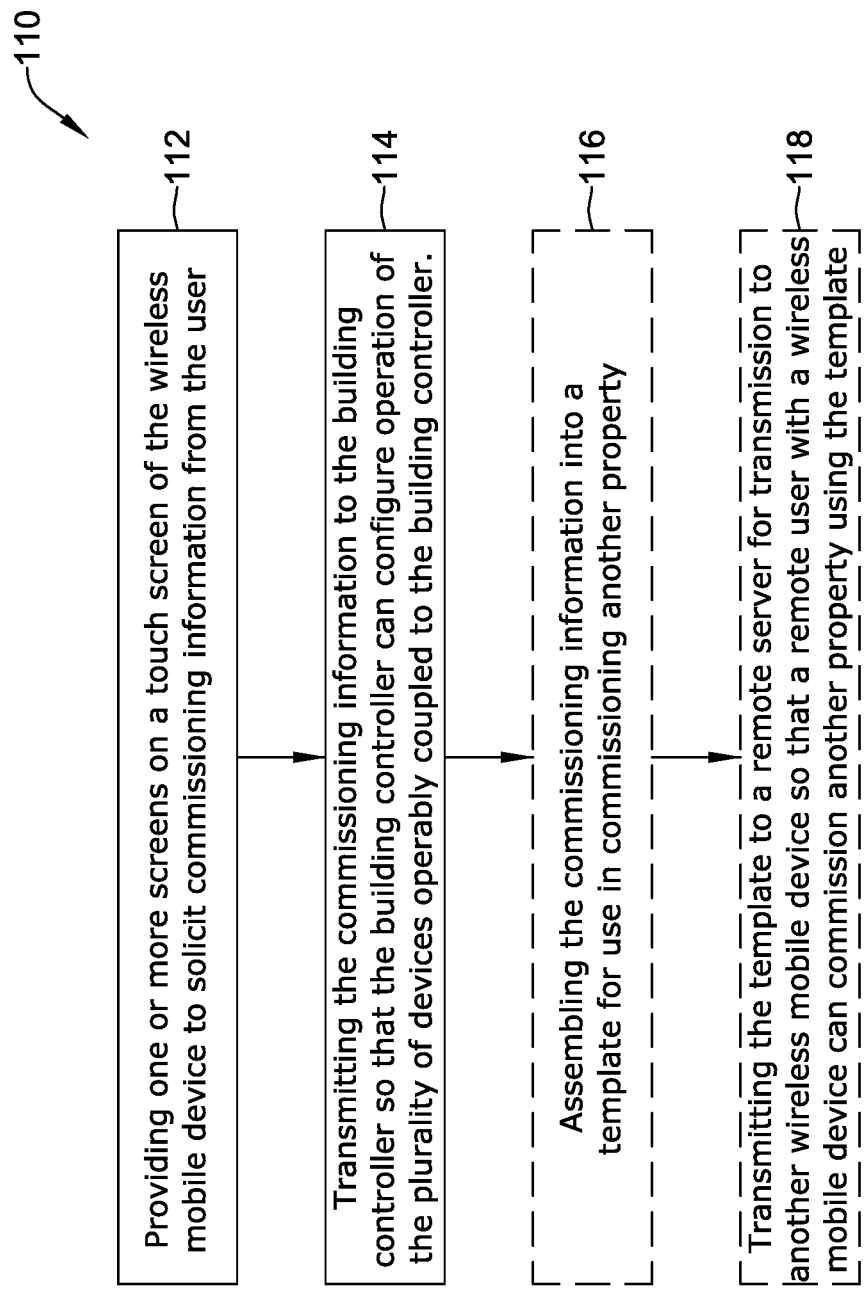
FIG. 7 is a flow diagram of an illustrative commissioning process.

FIG. 7 is a flow diagram showing an illustrative commissioning method 110 that may be carried out by the processor 26 of the wireless mobile device 20 executing the program instructions 24 stored in the memory 22. Execution of the program instructions 24 by the processor 26 may cause the wireless mobile device 20 to carry out a step of providing one or more screens on the touch screen 29 of the wireless mobile device 20 in order to solicit commissioning information from the user as indicated at block 112. It will be appreciated that any variety of commissioning information may be solicited from the user, including but not limited to the examples illustrated in blocks 94, 96, 98 and 100 of FIG. 6. After soliciting commissioning information from the user, and as indicated at block 114, the commissioning information may be transmitted to the building controller 18 so that the building controller 18 can configure operation of the plurality of devices operably coupled to the building controller 18.

In some cases, once the commissioning information has been obtained from the user, the commissioning information may be assembled into a template that may be used in commissioning another property, as noted at block 116. In some instances, the commissioning information may be used for commissioning another room in the same property. For example, a first bedroom may be commissioned, and the commissioning information may be assembled into a template that may be used in the same property for commissioning a second bedroom that is similar to the first bedroom, with similar devices and similar desired device settings in both rooms. After the commissioning information has been assembled into a template for subsequent use, the template may be stored in the memory 22 of the wireless mobile device 20. In some cases, and as illustrated at block 118, the template may be transmitted to a remote server for transmission to another wireless mobile device so that a remote user with a wireless mobile device can commission another room and/or another property using the template.

Figure 8:
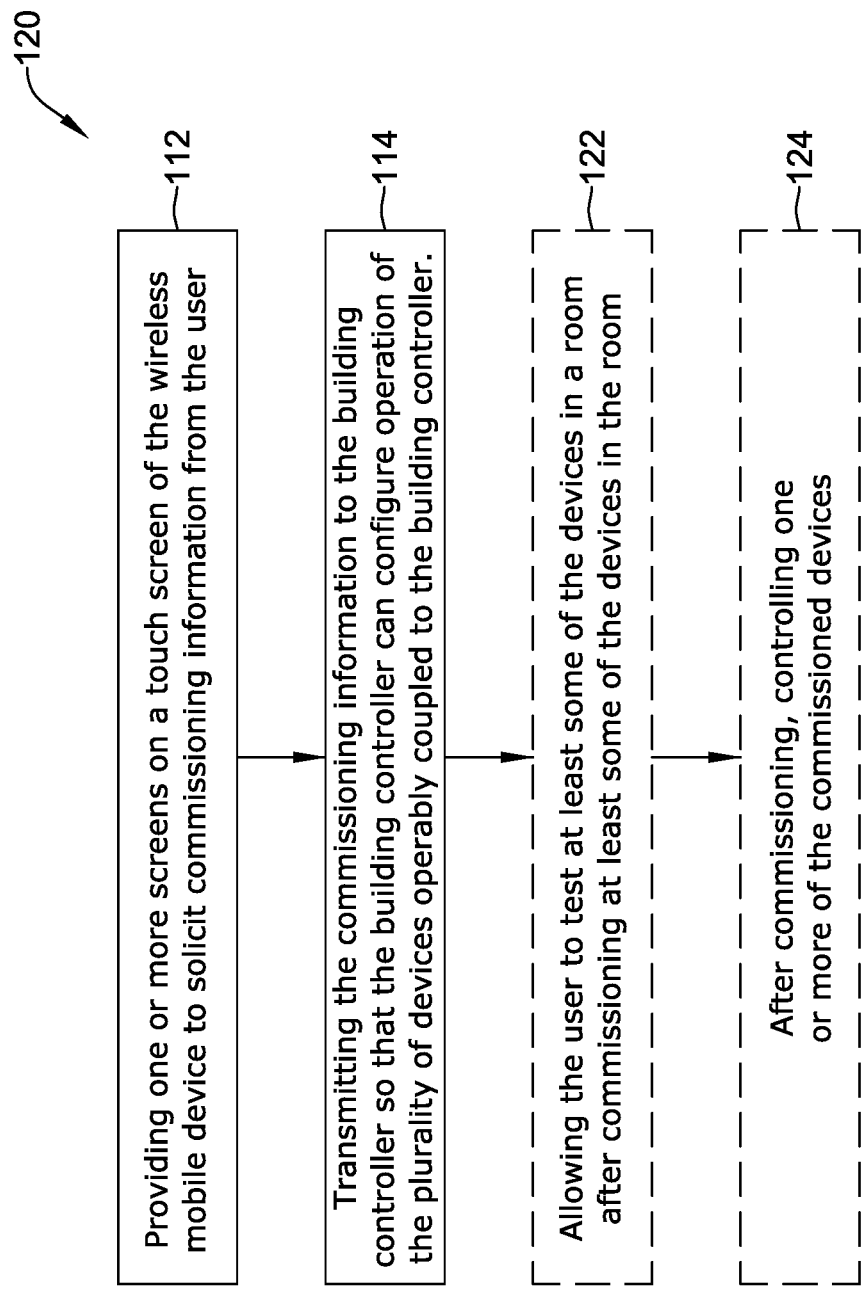
FIG. 8 is a flow diagram of an illustrative commissioning process.

FIG. 8 is a flow diagram showing an illustrative commissioning method 120 that may be carried out by the processor 26 of the wireless mobile device 20 executing the program instructions 24 stored in the memory 22. Execution of the program instructions 24 by the processor 26 may cause the wireless mobile device 20 to carry out a step of providing one or more screens on the touch screen 29 of the wireless mobile device 20 in order to solicit commissioning information from the user as indicated at block 112. It will be appreciated that any variety of commissioning information may be solicited from the user, including but not limited to the examples illustrated in blocks 94, 96, 98 and 100 of FIG. 6. After soliciting commissioning information from the user, and as indicated at block 114, the commissioning information may be transmitted to the building controller 18 so that the building controller 18 can configure operation of the plurality of devices operably coupled to the building controller 18.

In some cases, and as illustrated for example at block 122, the user may be allowed to test at least some of the devices in a room after commissioning at least some of the devices in the room. Testing may occur after all or some of the devices in the room have been commissioned, for example, or the user may be permitted to test each device after it is commissioned. Once the devices have been commissioned, the user may be allowed to control one or more of the commissioned devices using the wireless mobile device 20. This is illustrated at block 124.

Figure 9:
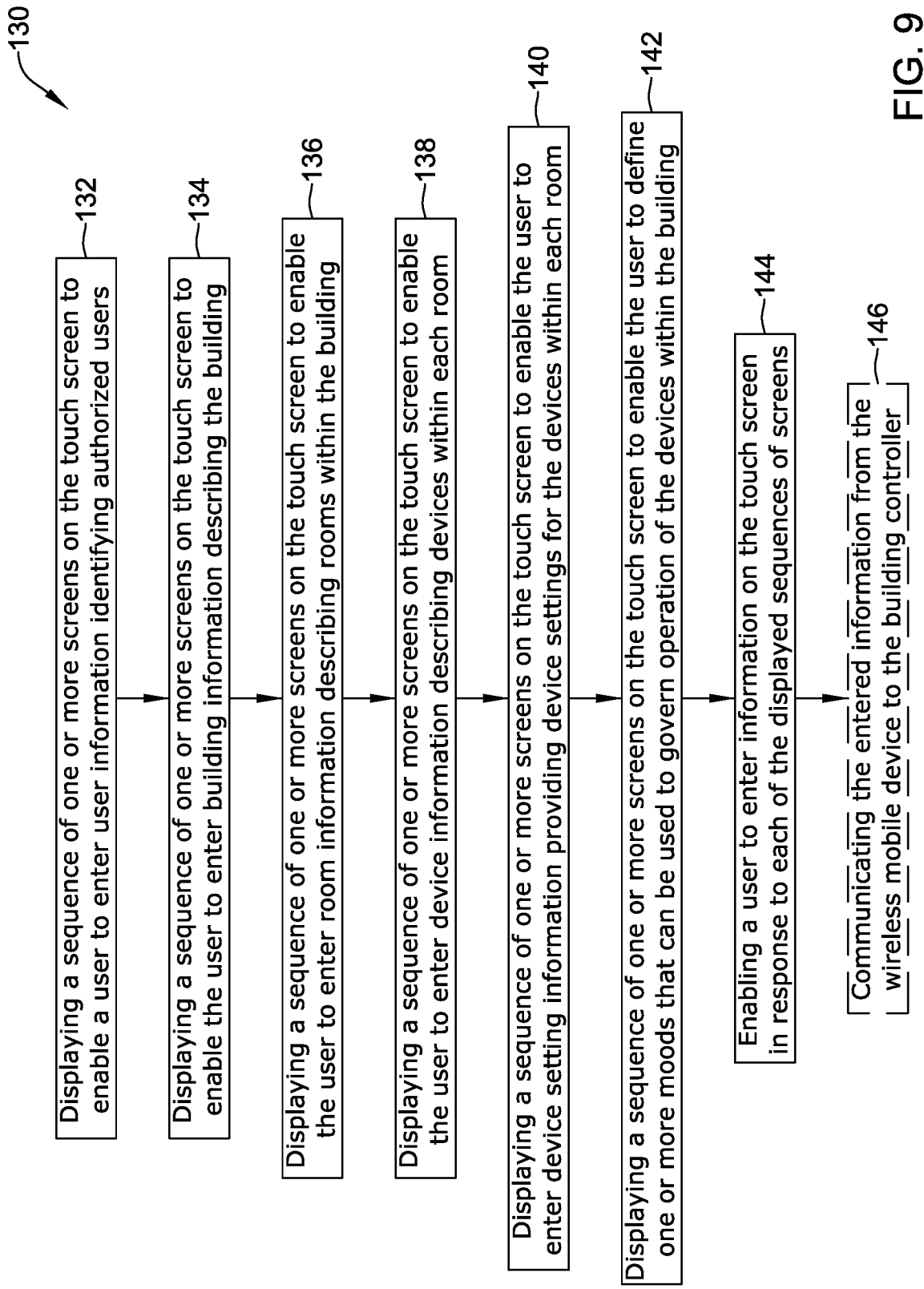
FIG. 9 is a flow diagram of an illustrative commissioning process.

FIG. 9 is a flow diagram showing an illustrative method 130 that may be carried out by the processor 26 of the wireless mobile device 20 executing the program instructions 24 stored in the memory 22. Execution of the program instructions 24 by the processor 26 may cause the wireless mobile device 20 to carry out a step of displaying a sequence of one or more screens on the touch screen 29 to enable a user to enter user information identifying authorized users, as indicated at block 132. At block 134, the wireless mobile device 20 may display a sequence of one or more screens on the touch screen 29 to enable the user to enter building information describing the building. The wireless mobile device 20 may display a sequence of one or more screens on the touch screen 29 to enable the user to enter room information describing rooms within the building, as indicated at block 136. As noted at block 138, a sequence of one or more screens may be displayed on the touch screen 29 to enable the user to enter device information describing devices within each room. The device information may include, for example, a device name, a device type and/or other information.

A sequence of one or more screens may be displayed on the touch screen 29 to enable the user to enter device setting information providing device settings for the devices within each room as indicated at block 140. It will be appreciated that some of the devices may include devices that are part of a lighting system, a security system, an HVAC system, a music system, a system of operable window coverings, among others. As noted at block 142, the wireless mobile device 20 may display a sequence of one or more screens on the touch screen 29 to enable the user to define one or more moods that can be used to govern operation of the devices within the building. The user may be enabled to enter information on the touch screen 29 in response to each of the displayed sequences of screens, as indicated at block 144. In some cases, as noted at block 146, the entered information may be communicated from the wireless mobile device 20 to the building controller 18.

Figure 10:
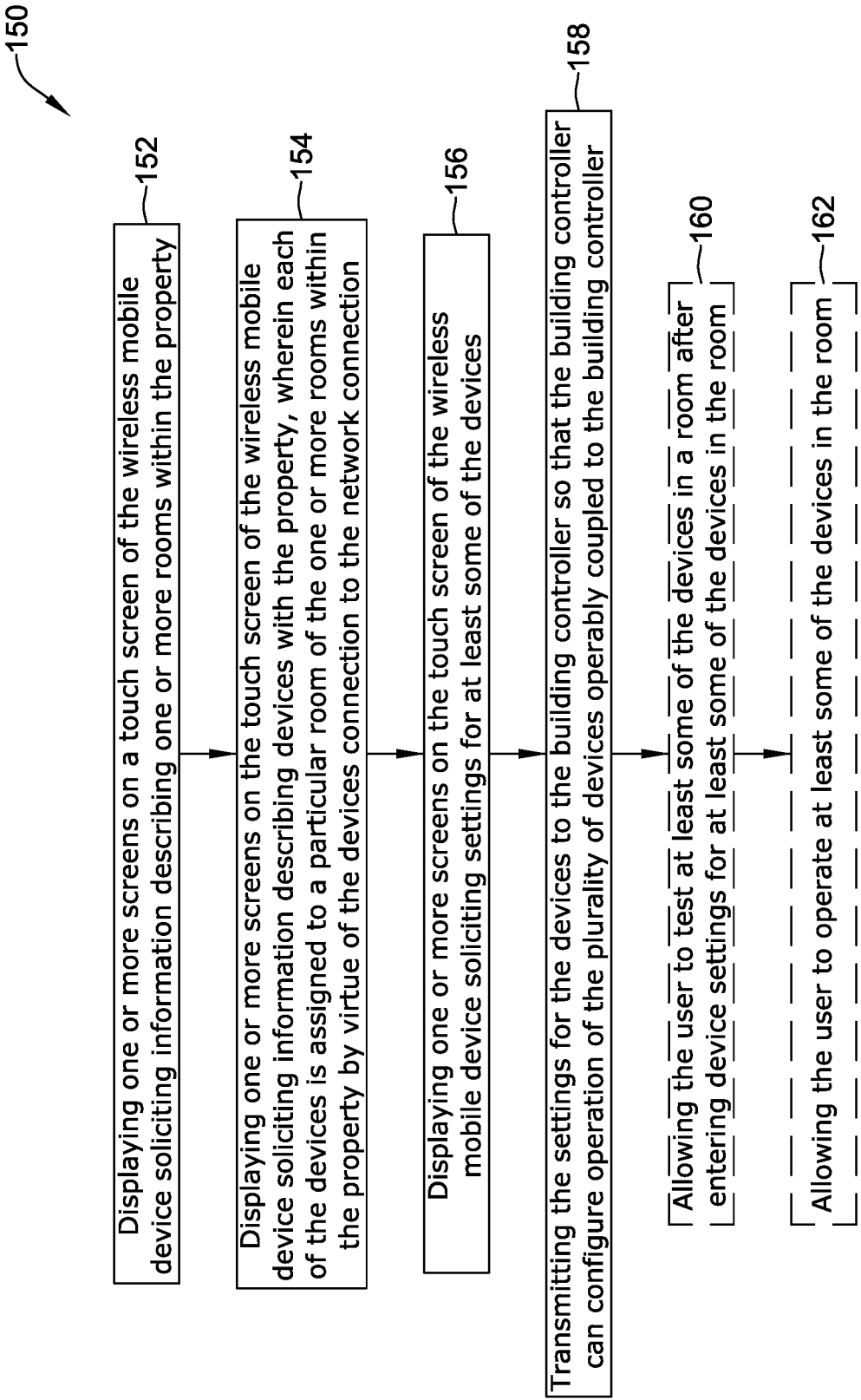
FIG. 10 is a flow diagram of an illustrative commissioning process.

FIG. 10 is a flow diagram showing an illustrative method 150 that may be carried out by the processor 26 of the wireless mobile device 20 executing the program instructions 24 stored in the memory 22. The program instructions 24 may facilitate a user of a wireless mobile device such as the wireless mobile device 20 in commissioning a property that includes a plurality of devices operably coupled to the building controller 18 via a network connection. Execution of the program instructions 24 by the processor 26 may cause the wireless mobile device 20 to carry out a step of displaying one or more screens on a touch screen of the wireless mobile device soliciting information describing one or more rooms within the property as indicated at block 152. One or more screens may be displayed on the touch screen 29 of the wireless mobile device 20 soliciting information describing devices with the property, wherein each of the devices is assigned to a particular room of the one or more rooms within the property by virtue of the device connection to the network connection as indicated at block 154. In some cases, the devices in a room are connected to a room sub-network that is hosted by a room controller, but this is not required. In some cases, the network address can be mapped to a particular room of the property. These are just some examples. As noted at block 156, one or more screens may be displayed on the touch screen 29 of the wireless mobile device 20 soliciting settings for at least some of the devices in the room. The settings for the devices may be transmitted to the building controller 18 so that the building controller 18 can configure operation of the plurality of devices operably coupled to the building controller 18, as indicated at block 158.

In some cases, and as noted at block 160, the user may be further allowed to test at least some of the devices in a room after entering device settings for at least some of the devices in the room. In some instances, the user may be allowed to operate at least some of the devices in the room as noted at block 162. In some cases, the user is able to control a device by touching a corresponding icon on the touch screen 29.

Figure 11:
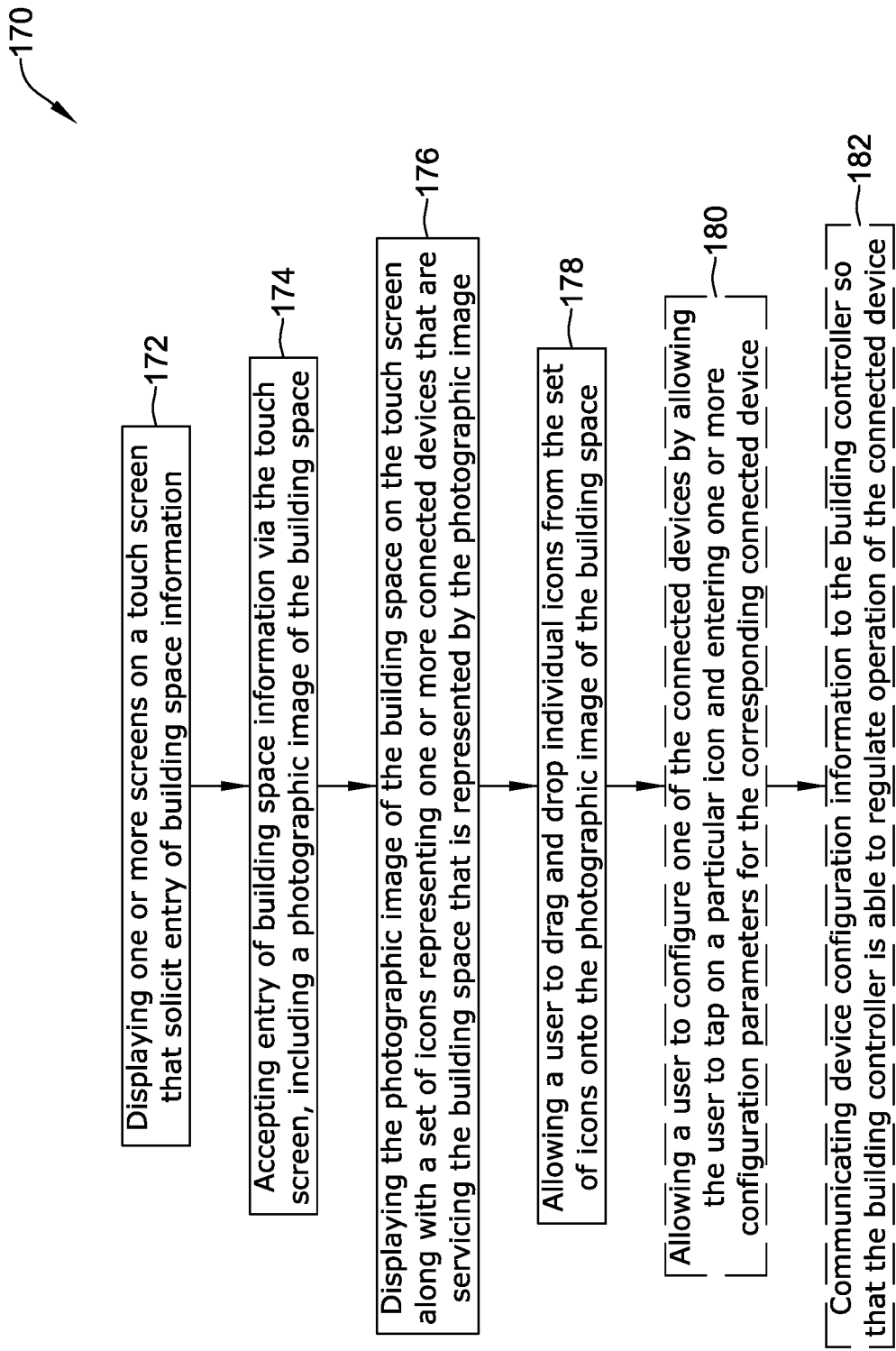
FIG. 11 is a flow diagram of an illustrative commissioning process.

FIG. 11 is a flow diagram showing an illustrative method 170 that may be carried out by the processor 26 of the wireless mobile device 20 executing the program instructions 24 stored in the memory 22 in order to configure operation of a plurality of connected devices within a building space, the building space having a building controller such as the building controller 18 operating one or more systems within the building space. In some cases, the building space may be a room within the building. Execution of the program instructions 24 by the processor 26 may cause the wireless mobile device 20 to carry out a step of displaying one or more screens on the touch screen 29 that solicit entry of building space information as indicated at block 172. As noted at block 174, entry of building space information may be accepted via the touch screen 29, including a photographic image of the building space. In some cases, the photographic image may be taken using the camera feature 27 of the wireless mobile device 20. In some instances, the photographic image may be a panoramic photographic image that is taken with the camera feature 27 of the wireless mobile device 20.

The photographic image of the building space may be displayed on the touch screen 29 along with a set of icons representing one or more connected devices that are servicing the building space that is represented by the photographic image, as indicated at block 176. As indicated at block 178, the user may be allowed to drag and drop individual icons from the set of icons of connected devices onto the photographic image of the building space. The individual icons may be placed on the photographic image at locations that correspond to the actual physical locations of the corresponding devices in the room. In some cases, this makes it easier to intuitively find and then control the various connected devices in the room. In some cases, after the individual icons have been placed onto the photographic image (e.g. over-laying the photographic image), the user may be allowed to configure one of the connected devices by allowing the user to tap on a particular icon and entering one or more configuration parameters for the corresponding connected device. In some cases, the device configuration information may be communicated to the building controller 18 so that the building controller 18 is able to regulate operation of the corresponding connected device.

Figure 12:
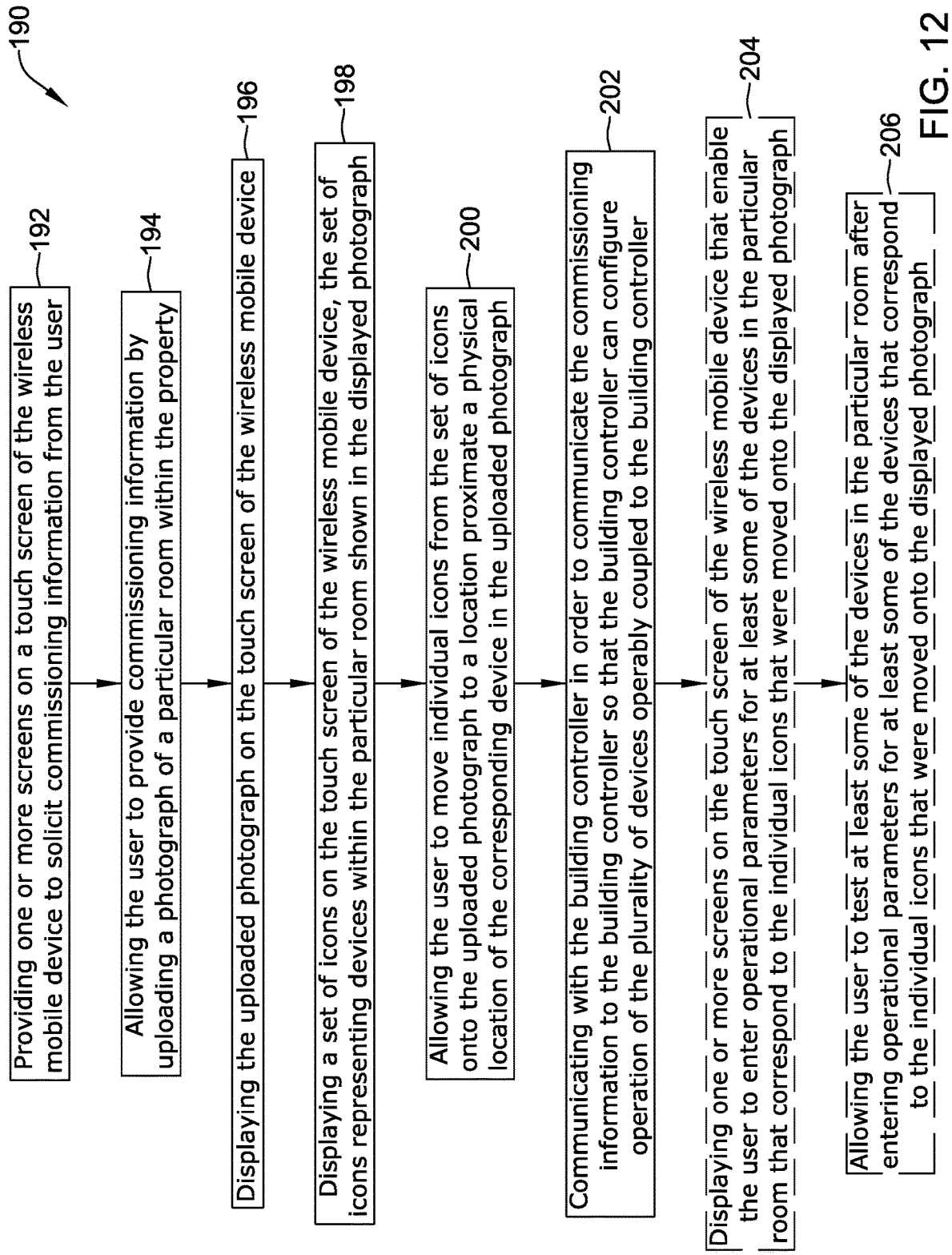
FIG. 12 is a flow diagram of an illustrative commissioning process.

FIG. 12 is a flow diagram showing an illustrative method 190 that may be carried out by the processor 26 of the wireless mobile device 20 executing the program instructions 24 stored in the memory 22 in order to configure operation of a plurality of connected devices within a building space, the building space having a building controller such as the building controller 18 operating one or more systems within the building space. In some cases, the building space may be a room within the building. Execution of the program instructions 24 by the processor 26 may cause the wireless mobile device 20 to carry out a step of providing one or more screens on the touch screen 29 of the wireless mobile device 20 to solicit commissioning information from the user as indicated at block 192 and allowing the user to provide commissioning information by uploading a photograph of a particular room within the property as indicated at block 194. The uploaded photograph may be displayed on the touch screen 29 of the wireless mobile device 20 as indicated at block 196.

In some cases, displaying the uploaded photograph on the touch screen 29 of the wireless mobile device 20 includes zooming in on the uploaded photograph in response to the user performing a pinch (or other) gesture on the uploaded photograph that is displayed on the touch screen 29 of the wireless mobile device 20. Displaying the uploaded photograph on the touch screen 29 of the wireless mobile device 20 may, for example, include zooming out on the uploaded photograph in response to the user performing a spread (or other) gesture on the uploaded photograph that is displayed on the touch screen 29 of the wireless mobile device 20. In some cases, displaying the uploaded photograph on the touch screen 29 of the wireless mobile device 20 includes zooming to a predetermined zoom level in response to the user performing a double tap (or other) gesture on the displayed photograph.

As indicated at block 198, a set of icons may be displayed on the touch screen 29 of the wireless mobile device 20, the set of icons representing devices within the particular room shown in the displayed photograph. In some cases, the devices in the particular room include one or more devices that the building controller 18 has detected as being connected to a sub-network (such as the sub-network 60 shown in FIG. 4) that is assigned to the particular room. In some instances, the building controller 18 may detect devices that are wired to the sub-network or are wirelessly connected to the sub-network. The devices in the room may include, for example, one or more of lighting devices, security devices, music devices, heating, cooling or ventilation devices, and adjustable window treatments.

The user may be allowed to move individual icons from the set of icons onto the uploaded photograph, where each individual icon can be moved to and overlay a location proximate a physical location of the corresponding device in the uploaded photograph, thereby allowing the location of each individual icon to help identify the corresponding device as noted at block 200. In some cases, allowing the user to move individual icons includes allowing the user to use drag and drop maneuvers to move the individual icons. As indicated at block 202, in some cases the commissioning information may be communicated to the building controller 18 so that the building controller 18 can configure operation of the plurality of devices operably coupled to the building controller 18.

In some cases, as indicated at block 204, one or more screens may be displayed on the touch screen 29 of the wireless mobile device 20 that enable the user to enter operational parameters for at least some of the devices in the particular room that correspond to the individual icons that were moved onto the displayed photograph. In some cases, as indicated at block 206, the user may be allowed to test at least some of the devices in the particular room after entering operational parameters for at least some of the devices that correspond to the individual icons that were moved onto the displayed photograph.

Figure 13:
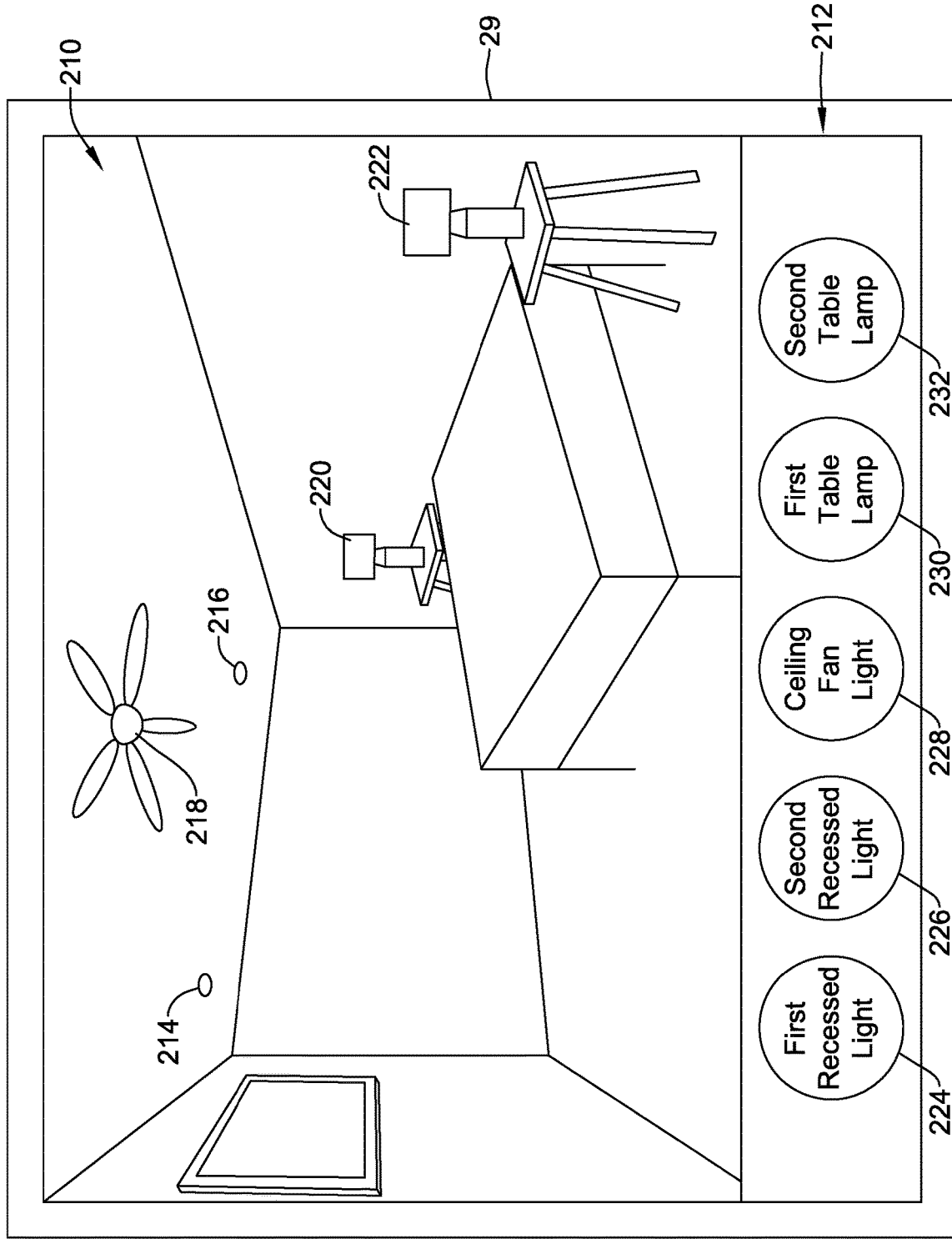
FIG. 13 is an illustrative wireless mobile device screen shot with a ribbon including device icons and a room image.
Figure 14:
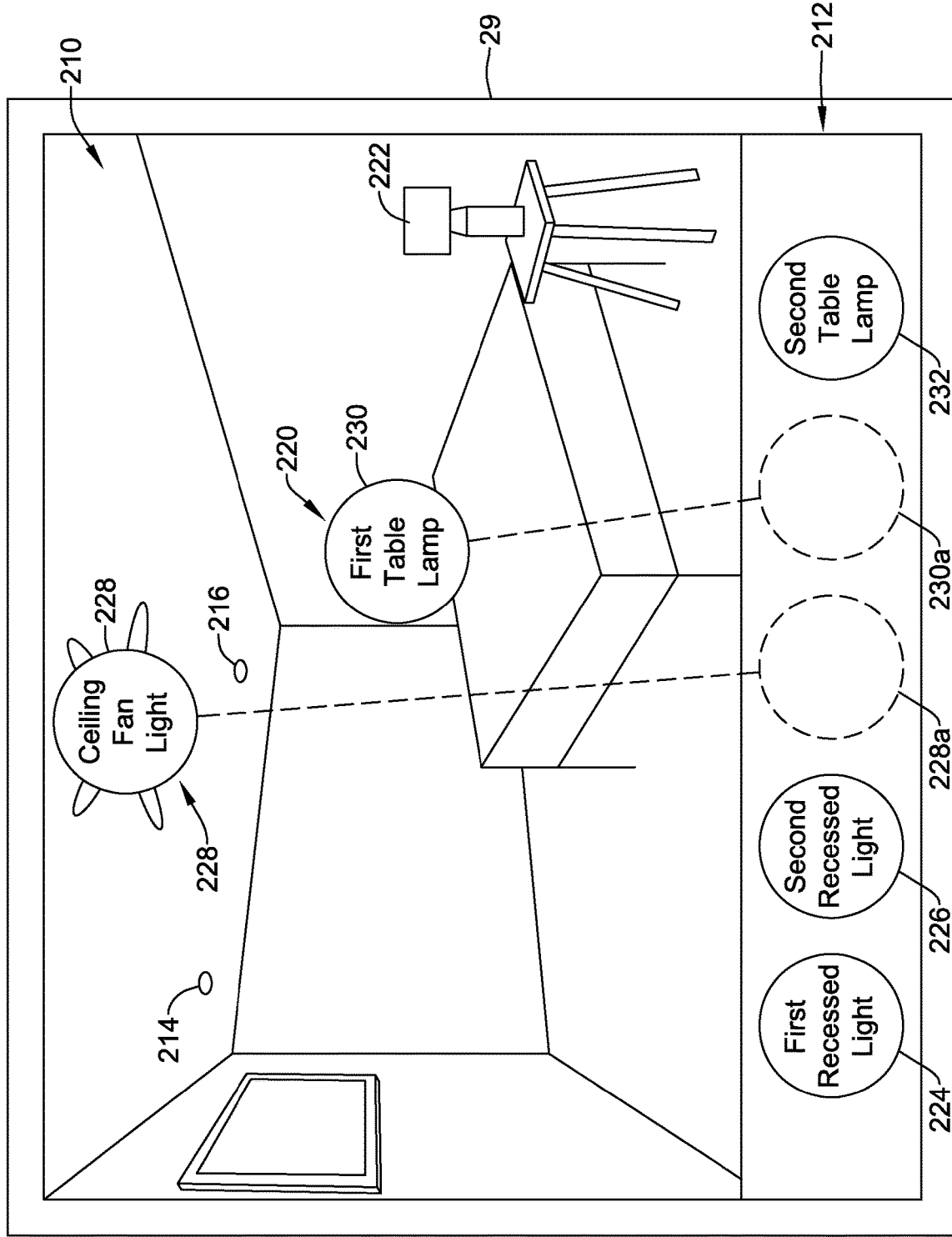
FIG. 14 is an illustrative wireless mobile device screen shot showing device icons being dragged and dropped from the ribbon to appropriate locations on the room image.

FIGS. 13 and 14 provide a graphical representation of the illustrative methods 170 and 190 shown in FIGS. 11 and 12, respectively. FIG. 13 shows a photograph 210 displayed on the touch screen 29. As shown, the photograph 210 shows a bedroom. It will be appreciated that this is merely illustrative, as the methods 170 and 190 may be used in commissioning any number of different types of rooms, spaces and building areas. In the example shown, a ribbon 212 is displayed underneath the photograph 210, although in some cases the ribbon 212 may be displayed above the photograph 210, along a left side of the photograph 210, along a right side of the photograph 210 or even disposed across the photograph 210. The ribbon 212 includes a number of icons that correspond to actual devices in the room.

Ribbons such as the ribbon 212 may be utilized in combination with a variety of screens for displaying and organizing information. A ribbon is a place for contextual controls and options that are relevant to what is being shown on a display of the wireless mobile device 20. If a particular room is being displayed, a ribbon may include a row of icons that can be selected to pull up a panel in which relevant settings for devices within that particular room may be viewed and/or modified. In some cases, a ribbon may include a primary row that includes a number of icons, at least some of which may be selected to pull up a secondary row. The secondary row may itself include a number of icons that can be individually selectable to pull up additional panels. The installer or other user may scroll through a ribbon to navigate. While a ribbon is used as an example, it is contemplated that any suitable menu structure may be used including pull-down menus, pop-up windows, and/or any other suitable menu structure.

As can be seen, the bedroom includes a first recessed light 214, a second recessed light 216, a ceiling fan including a ceiling fan light 218, a first table lamp 220 and a second table lamp 222. Accordingly, the illustrative ribbon 212 includes a first recessed light icon 224, a second recessed light icon 226, a ceiling fan light icon 228, a first table lamp icon 230 and a second table lamp icon 232. It will be appreciated that if the room includes additional controllable devices, the ribbon 212 could also include additional corresponding device icons. The icons shown on the ribbon 212 may be used to configure and/or control the corresponding devices that are in the room. In some cases, each icon may be moved onto the displayed photograph 210, and dropped at a location corresponding to where the actual device is shown in the displayed photograph 210. As a result, it is easy to see which icon are appropriate for configuring and/or controlling each device. In some cases, the icons may or may not include identifying labels, although descriptive labels are shown in FIGS. 13 and 14.

In comparing FIG. 13 and FIG. 14, it can be seen that the ceiling fan light icon 228 has been moved from an original position 228a on the ribbon 212 and placed onto the photograph 210 at a location roughly equal to where the ceiling fan light 218 is located. The first table lamp icon 230 has been moved from an original position 230a on the ribbon 212 and placed onto the photograph 210 at a location roughly equal to where the first table lamp 220 is located. The user may continue to move the remaining icons, such as the first recessed light icon 224, the second recessed light icon 226, and the second table lamp icon 232 onto the photograph 210. In some cases, the icons may be moved from the ribbon 212 to desired locations on the photograph 210 using a drag and drop maneuver.

Figure 15:
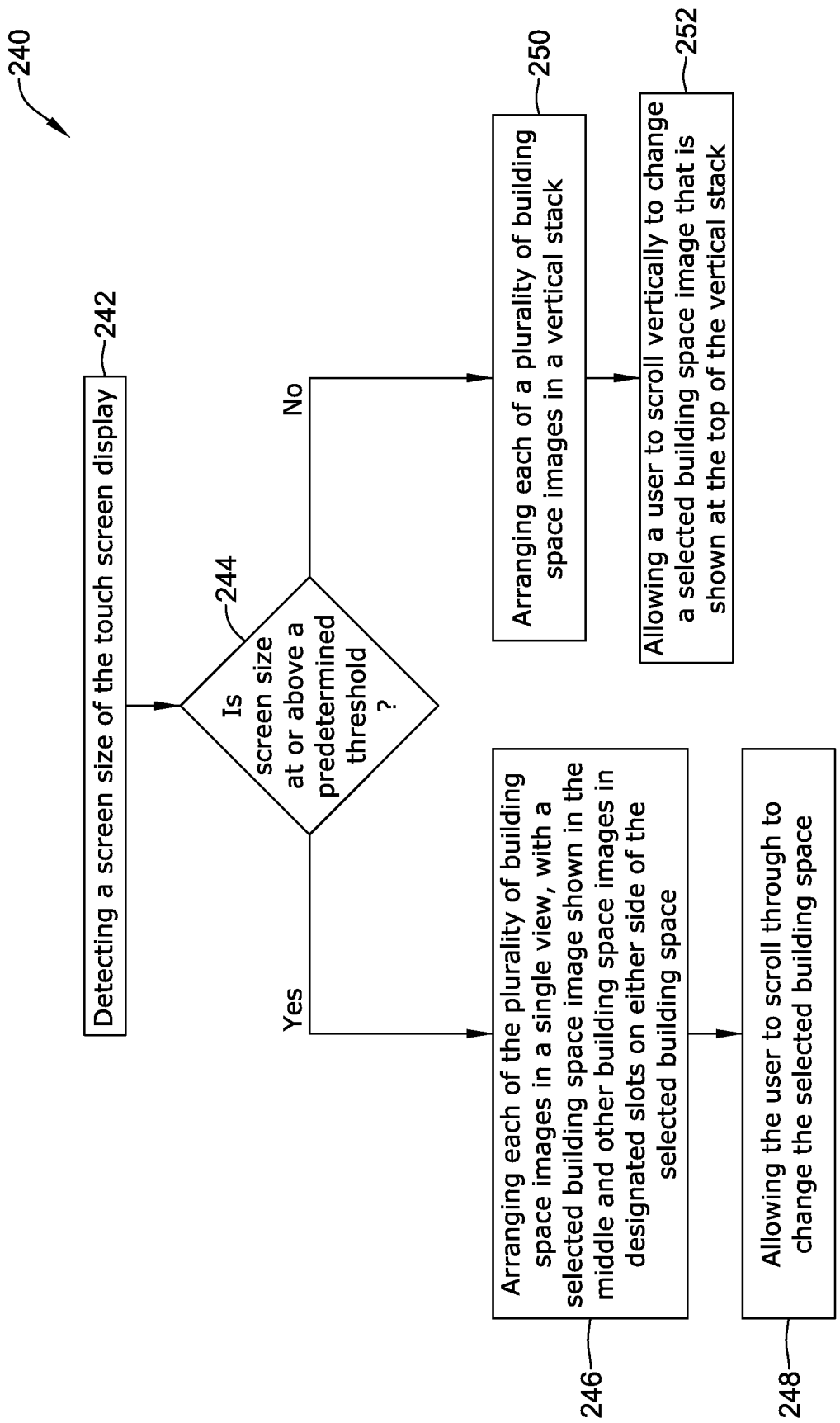
FIG. 15 is a flow diagram of an illustrative commissioning process.

FIG. 15 is a flow diagram showing an illustrative method 240 of displaying a plurality of building space images that may be carried out by the processor 26 of the wireless mobile device 20 executing the program instructions 24 stored in the memory 22. Execution of the program instructions 24 by the processor 26 may cause the wireless mobile device 20 to carry out a step of detecting a screen size of the touch screen 29, as noted at block 242. At decision block 244, a determination is made as to whether the screen size of the touch screen 29 is at or above a predetermined threshold, or if the screen size is below the predetermined threshold. A value for the predetermined threshold may be user defined, or it may be determined by the manufacturer and programmed into the program instructions 24.

In some cases, when the screen size of the touch screen 29 is at or above the predetermined threshold, each of the plurality of building spaces may be arranged in a single view, with a selected building space image shown in the middle and other building space images in designated slots on either side of the selected building space, as indicated at block 246. The user may be allowed to scroll through to change the selected building space, as indicated at block 248. In some cases, the selected building space image may be shown larger than the other displayed building space images. In some instances, if the screen size of the touch screen 29 is at or above the predetermined threshold, the wireless mobile device may be deemed to be a large smart phone, a phablet or a tablet.

Figure 16:
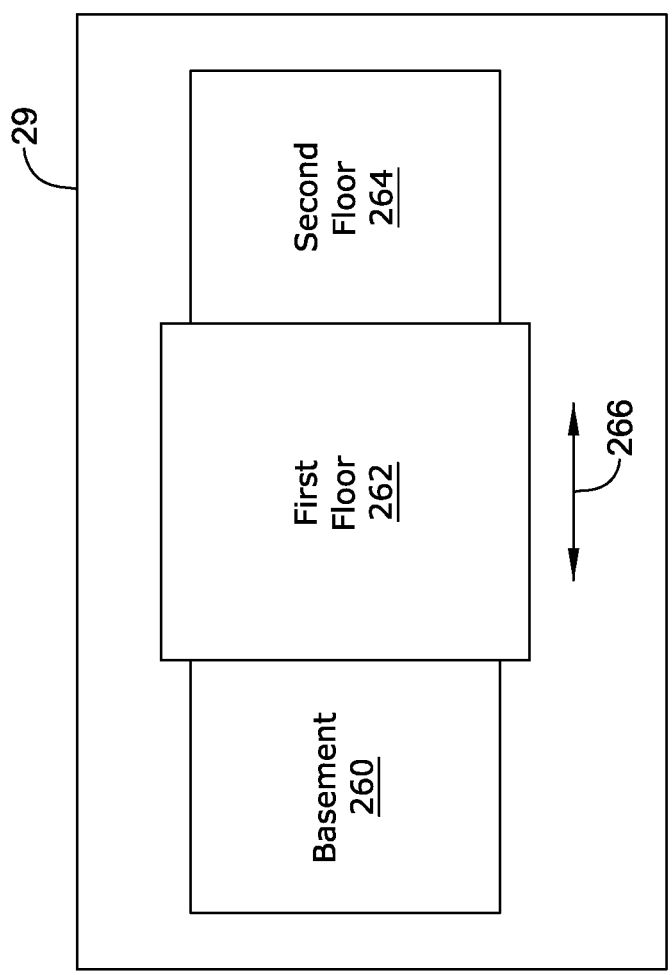
FIG. 16 is an illustrative graphical representation of how building space images may be displayed on a larger display.
Figure 17:
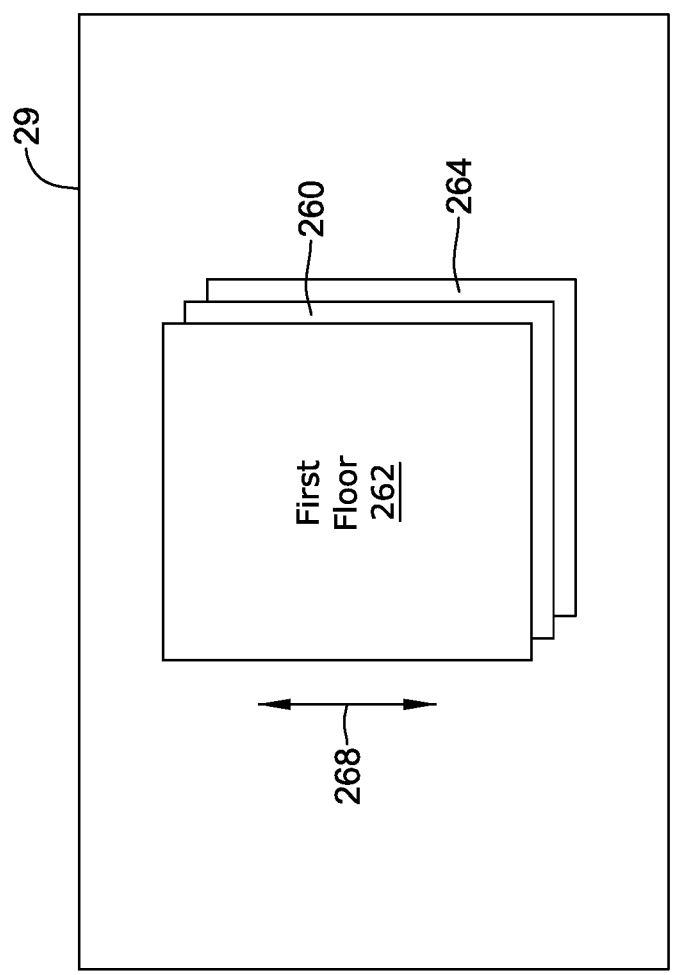
FIG. 17 is an illustrative graphical representation of how building space images may be displayed on a smaller display.

Returning to the decision block 244, when the screen size of the touch screen 29 is determined to be below the predetermined threshold, each of the plurality of building space images may be arranged in a vertical stack, as indicated at block 250. The user may be allowed to scroll vertically to change a selected building space image that is shown at the top of the vertical stack, as indicated at block 252. In some cases, if the screen size of the touch screen 29 is below the predetermined threshold, the wireless mobile device 20 may be deemed to be a small smart phone. FIGS. 16 and 17 provide a graphical representation of how building space images may be displayed, depending on whether the wireless mobile device 20 has a relatively large display space, such as if the wireless mobile device 20 has been deemed to be a large smart phone, a phablet or a tablet, or if the wireless mobile device 20 has been deemed to be a small smart phone.

FIG. 16 illustrates a display arrangement for a larger touch screen 29 while FIG. 17 illustrates a display arrangement for a smaller touch screen 29. In FIG. 16, the touch screen 29 displays three building space images. As illustrated, they are schematically labeled BASEMENT 260, FIRST FLOOR 262 and SECOND FLOOR 264. In some cases, the building space images may instead reference individual rooms, rather than individual floors of the building 12. As shown, the FIRST FLOOR 262 is the selected building space image, as it is larger than the other building space images and is centered. In some cases, as shown, the selected building space image overlies a portion of the other building space images. The user is able to change which building space image is the selected building space image by scrolling left or right, as generally indicated by an arrow 266. Scrolling to the left, for example, would result in the BASEMENT 260 becoming the selected building space image, with the FIRST FLOOR 262 displayed to the left (where the BASEMENT 260 is currently shown) and the BASEMENT 260 displayed larger and in the center (where the FIRST FLOOR 262 is currently shown).

In FIG. 17, the touch screen 29 displays the same three building space images as shown in FIG. 16. Again, the FIRST FLOOR 262 is the selected building space image, and thus is shown on the top of a stack of building space images. The user is able to change which building space image is the selected building space image by scrolling vertically (or in some cases horizontally), as generally indicated by an arrow 268. Scrolling vertically in a first direction, for example, may cause the selected building space image to change positions with the building space image directly below it. Scrolling vertically in a second direction may cause the selected building space image to move to the bottom of the stack, thereby displaying the building space image that was previously second in line. These are just examples.

Figure 18:
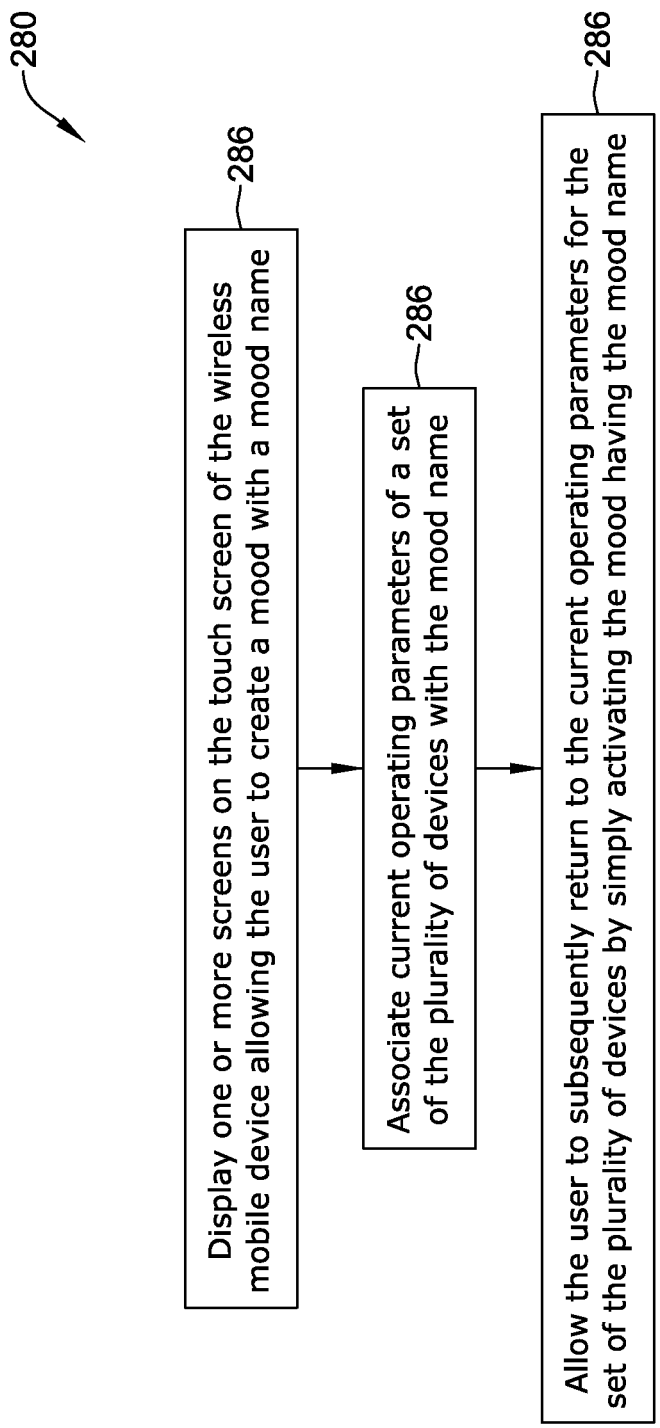
FIG. 18 is a flow diagram of an illustrative process for creating a mood.

FIG. 18 is a flow diagram showing an illustrative method 280 of creating moods that may be useful in specifying settings for a plurality of devices within a building space. The method 280 may be carried out by the processor 26 of the wireless mobile device 20 executing the program instructions 24 stored in the memory 22. Execution of the program instructions 24 by the processor 26 may cause the wireless mobile device 20 to carry out a step of displaying one or more screens on the touch screen 29 of the wireless mobile device 20 allowing the user to create a mood with a mood name, as indicated at block 282. The set of the plurality of devices that is associated with the mood may include one or more of a lighting device, a security device, an HVAC device, a music device, an actuatable window covering and/or any other suitable device. In some cases, the set of the plurality of devices that is associated with the mood service a specific room within a property. In some instances, the set of the plurality of devices that is associated with the mood service two or more rooms within the property. In some cases, the set of the plurality of devices that is associated with the mood service the entire property. The current operating parameters of a set of the plurality of devices may be associated with the mood name as indicated at block 284. The user can subsequently return to the current operating parameters for the set of the plurality of devices by simply activating the mood having the mood name, as indicated at block 286.

Figure 19:
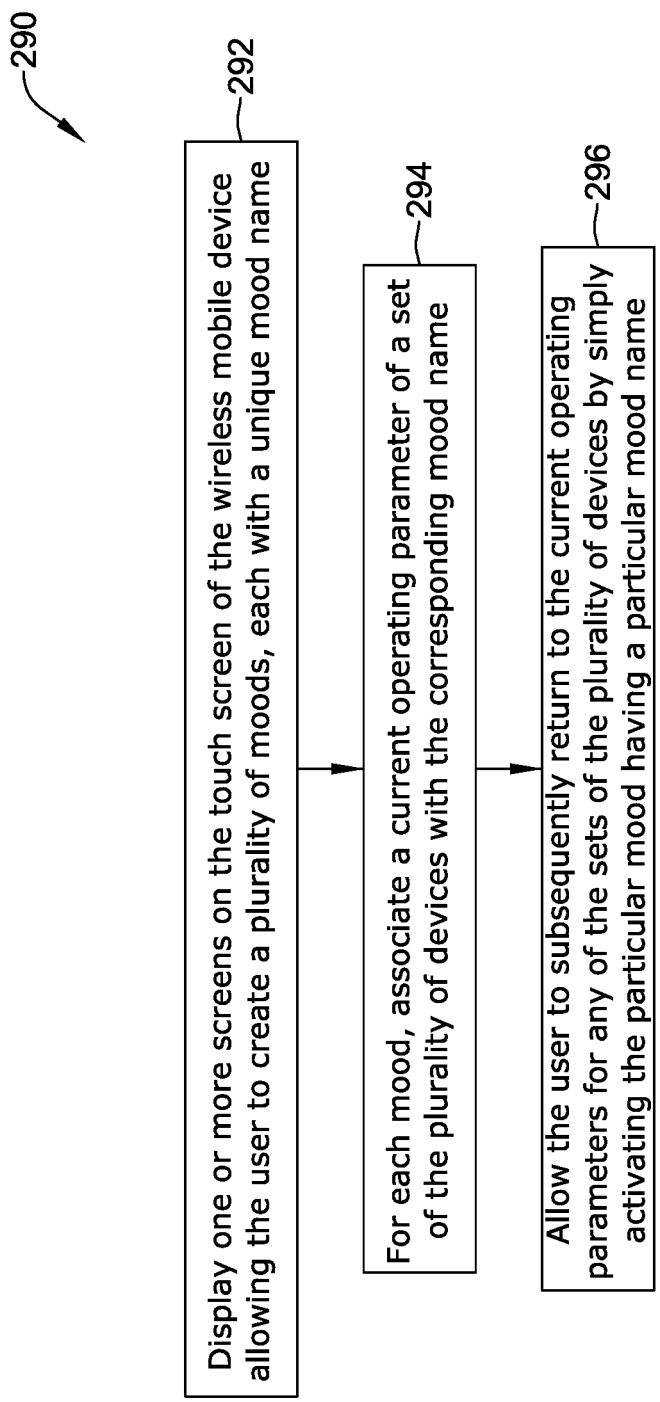
FIG. 19 is a flow diagram of an illustrative process for creating moods.
Figure 20:
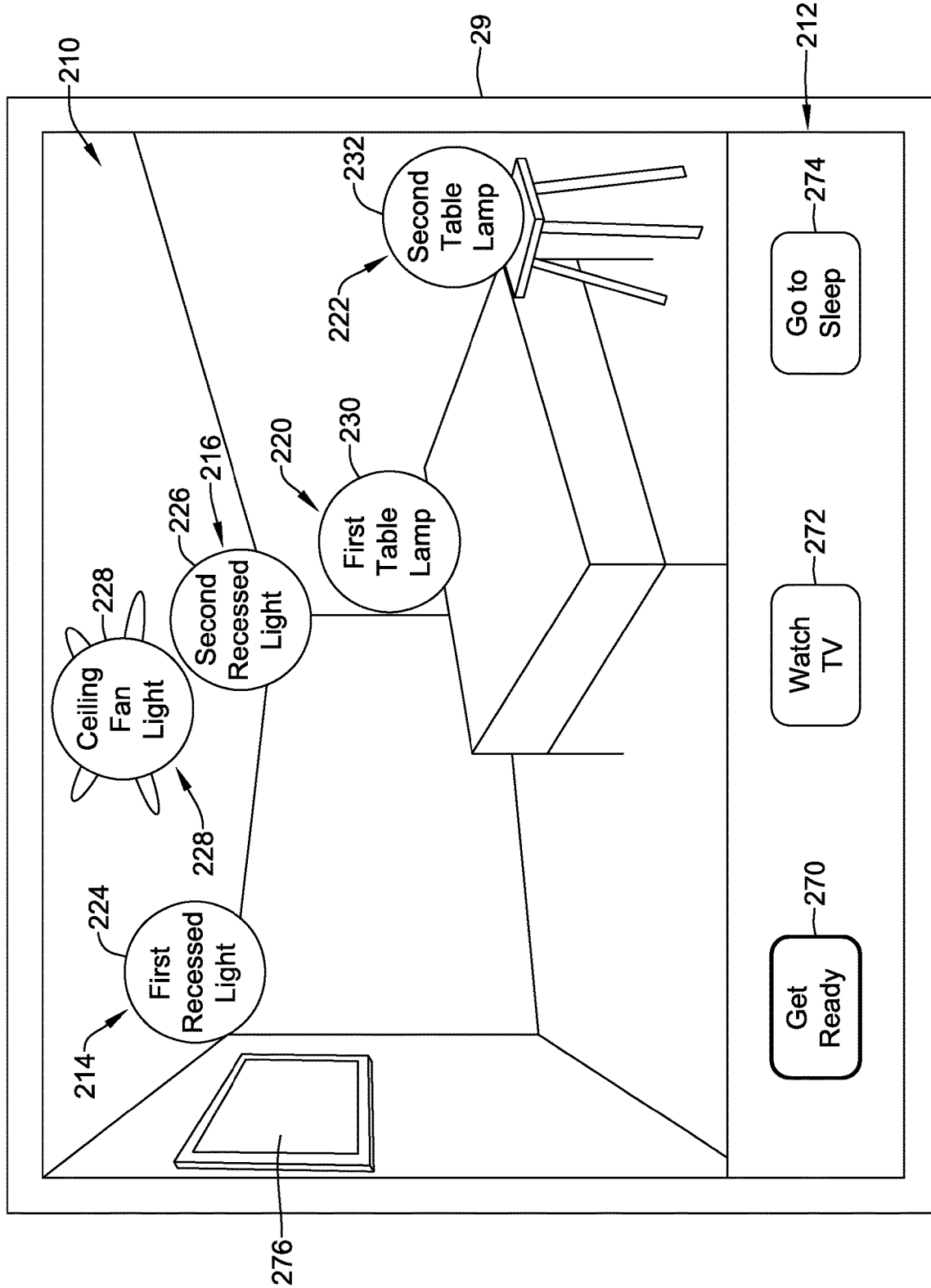
FIG. 20 is an illustrative wireless mobile device screen shot with a ribbon that includes plurality of moods.

FIG. 19 is a flow diagram showing an illustrative method 290 of creating moods that may be useful in specifying settings for a plurality of devices within a building space. The method 290 may be carried out by the processor 26 of the wireless mobile device 20 executing the program instructions 24 stored in the memory 22. Execution of the program instructions 24 by the processor 26 may cause the wireless mobile device 20 to carry out a step of displaying one or more screens on the touch screen 29 of the wireless mobile device 20 allowing the user to create a plurality of moods each having a unique mood name and corresponding operating parameters for a corresponding set of the plurality of devices, as indicated at block 292. For each mood, the current operating parameters of a set of the plurality of devices may be associated with the corresponding mood name as indicated at block 294. The user can subsequently return to the current operating parameters for any of the sets of the plurality of devices by simply activating the particular mood having a particular mood name, as indicated at block 296. In some cases, each of the created moods are displayed in a ribbon on one or more screens displayed on the touch screen of the wireless mobile device, wherein a particular mood may be activated by selecting the particular mood from the ribbon. In some instances, the ribbon displays an indication of a currently selected mood name, and also displays a listing of currently unselected mood names that are available for selection. FIG. 20 illustrates a ribbon 212 including several mood names.

FIG. 20 is a graphical representation of the touch screen 29 of the wireless mobile device 20, showing the photograph 210 (originally shown in FIG. 13). In FIG. 20, each of the device icons have been moved into their corresponding locations on the photograph 210. The ribbon 212 shows several mood names. As illustrated, the moods that have been created for this particular room are GET READY, as indicated by a GET READY icon 270, WATCH TV, as indicated by a WATCH TV icon 272 and GO TO SLEEP, as indicated by a GO TO SLEEP icon 274. As shown, the GET READY icon 270 has been selected, as indicated by the heavier border around the icon. In some instances, the selected mood icon may be bolded, may be colored a different color, or may be highlighted or illuminated. These are just examples. For the selected mood, GET READY, this may correspond to a mood that is selected in the morning, when the occupant or occupants of the illustrated room are getting ready for their day. In this example, this may mean that all of the lights are illuminated. The first recessed light 214, the second recessed light 216, the ceiling fan light 218, the first table lamp 220 and the second table lamp 222 are all illuminated.

If the occupant or occupants of the room, which is shown as being a bedroom, want to watch a television 276, they may select a corresponding mood by selecting the WATCH TV icon 272. For the WATCH TV mood, perhaps the first recessed light 214 and the second recessed light 216 remain illuminated while the other lights are turned off. Alternatively, perhaps the first table lamp 220 and the second table lamp 222 remain illuminated while the other lights are turned off. These are just examples. In a GO TO SLEEP mood, which may be selected by choosing the GO TO SLEEP icon 274, perhaps all of the lights are turned off except for a nightlight (not shown). It will be appreciated that the mood icons shown are merely illustrative, as any number of different moods may be created.

Figure 21:
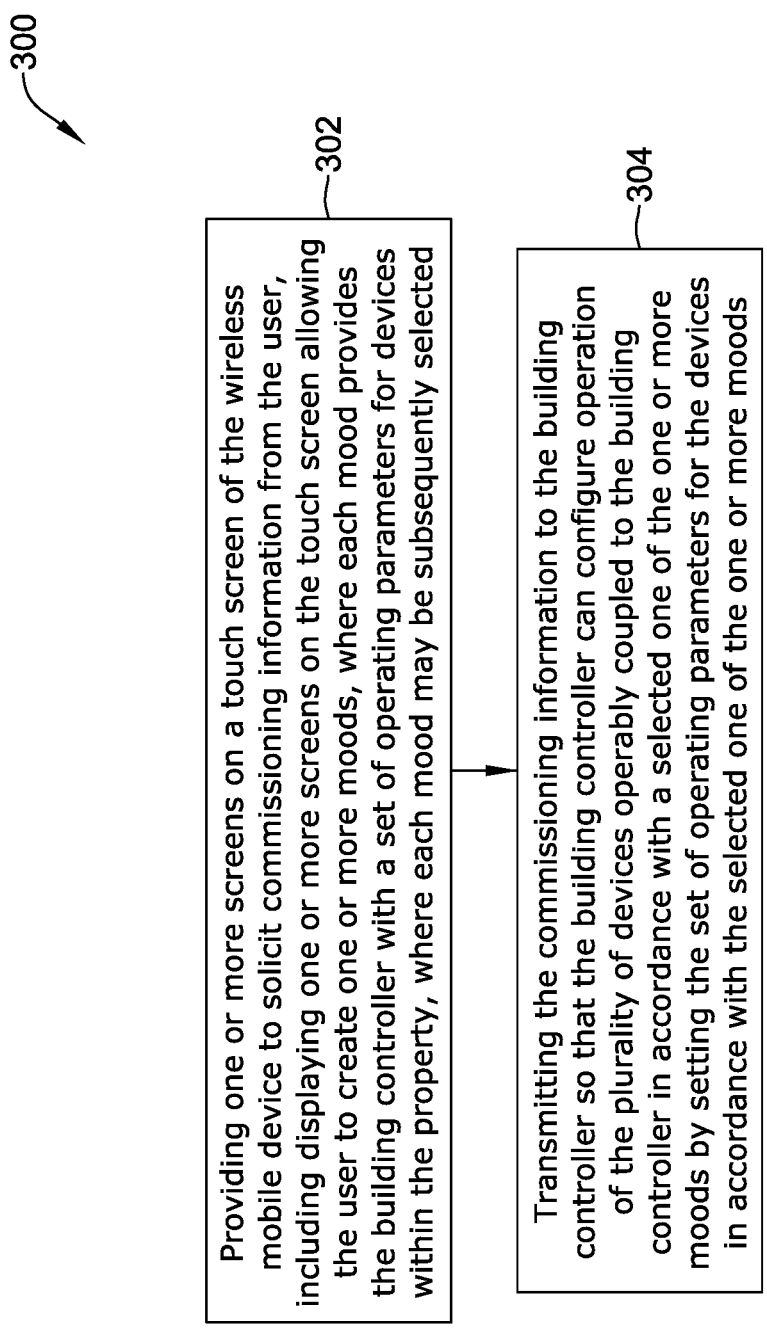
FIG. 21 is a flow diagram of an illustrative process for creating moods.

FIG. 21 is a flow diagram showing an illustrative method 300 of soliciting commissioning information from a user, including creating moods that may be useful in specifying settings for a plurality of devices within a building space. The method 300 may be carried out by the processor 26 of the wireless mobile device 20 executing the program instructions 24 stored in the memory 22. Execution of the program instructions 24 by the processor 26 may cause the wireless mobile device 20 to carry out a step of providing one or more screens on the touch screen 29 of the wireless mobile device 20 to solicit commissioning information from the user, including displaying one or more screens on the touch screen 29 allowing the user to create one or more moods, where each mood provides the building controller 18 with a set of operating parameters for devices within the property, where each mood may be subsequently selected, as indicated at block 302. In some cases, the user may be allowed to create one or more moods, and to set one or more operating parameters for devices within the property for each of the created moods. In some cases, the user may set the operating parameters of each of the devices in the room to a desired state (e.g. turning on/off certain lights, setting a room temperature for the room, etc.), and then create a mood that stores the set state for each of the devices. The user may then name the mood, and the mood may be saved. Once saved, the devices may be returned to the same state by selecting the mood name. The commissioning information, including the mood names and the corresponding device states, may be transmitted to the building controller 18 so that the building controller 18 can configure operation of the plurality of devices operably coupled to the building controller 18 in accordance with a selected one of the one or more moods by setting the set of operating parameters for the devices in accordance with the selected one of the one or more moods.

In some cases, one of the one or more moods includes a room mood that includes a set of operating parameters for devices within a particular room. In some instances, one of the one or more moods includes a property mood and includes a set of operating parameters for devices of two or more rooms and possibly exterior devices. One of the one or more moods may include one or more operating parameters for one or more lighting sources within the property. One of the one or more moods may include one or more operating parameters for one or more HVAC sources within the property. One of the one or more moods may include one or more operating parameters for one or more actuatable window coverings within the property. In some cases, one of the one or more moods may include one or more operating parameters for a combination of two or more of lighting sources, HVAC sources, security sources and actuatable window coverings.

Figure 22:
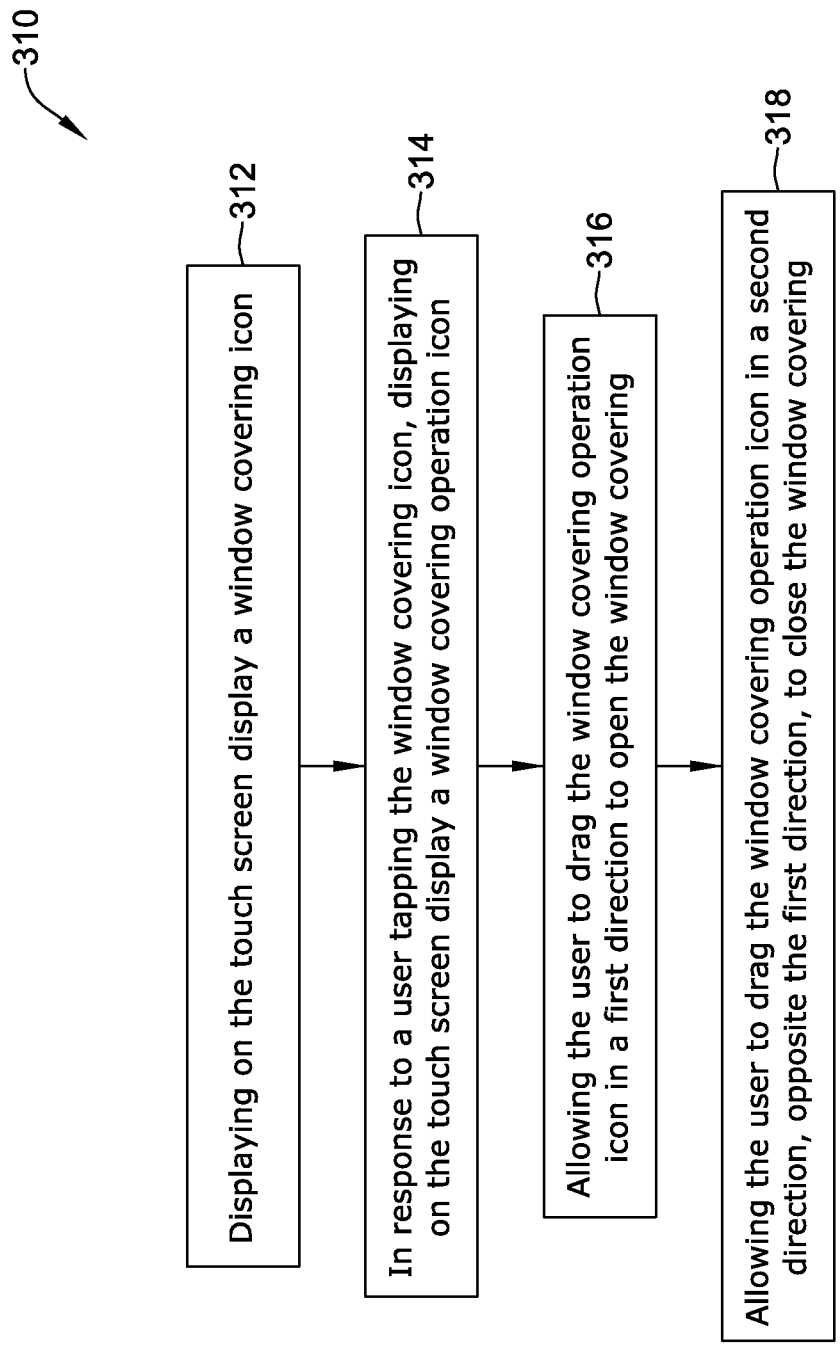
FIG. 22 is a flow diagram of an illustrative process for controlling an operable window treatment.

FIG. 22 is a flow diagram showing an illustrative method 310 of using the wireless mobile device 20 to operate window treatments. The method 310 may be carried out by the processor 26 of the wireless mobile device 20 executing the program instructions 24 stored in the memory 22. Execution of the program instructions 24 by the processor 26 may cause the wireless mobile device 20 to carry out a step of displaying a window covering icon on the touch screen 29, as indicated at block 312. A window covering operation icon may be displayed on the touch screen 29 in response to a user tapping the window covering icon, as indicated at block 314. As shown at block 316, the user may be allowed to drag the window covering operation icon in a first direction to open the window covering. The user may be allowed to drag the window covering operation icon in a second direction, opposing the first direction, to close the window covering as indicated at block 318. In some cases, the window covering operation icon may snap to a predetermined position when the user lifts their finger from the window covering operation icon.

In some cases, the window covering includes a curtain or vertical blinds that open and close laterally. The user may drag the window covering operation icon to the right to open the window covering and may drag the window covering operation icon to the left to close the window covering. In some cases, the window covering includes horizontal blinds and open and close vertically. The user may drag the window covering operation icon up to raise the window covering and down to lower the window covering. These are just examples.

In some instances, the window covering may include top-down bottom-up horizontal blinds where a top portion of the horizontal blinds can be raised or lowered independently of a bottom portion of the horizontal blinds being raised or lowered. The window covering operation icon may include a first icon portion corresponding to the top portion of the horizontal blinds and a second icon portion corresponding to the bottom portion of the horizontal blinds. The user may drag the first icon portion up to raise the top portion of the horizontal blinds and down to lower the top portion of the horizontal blinds. The user may drag the second icon portion up to raise the bottom portion of the horizontal blinds and down to lower the bottom portion of the horizontal blinds. These are just examples. FIGS. 23 through 27 illustrate control of various operable window treatments using the wireless mobile device 20.

Figure 23:
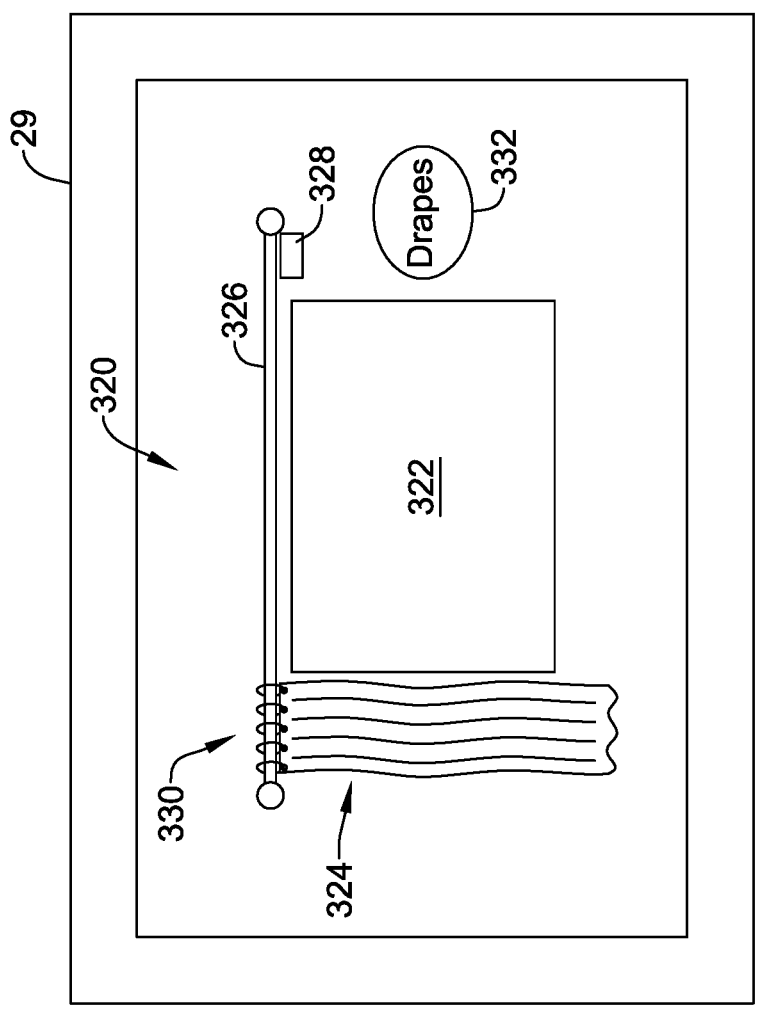
FIGS. 23-26B are illustrative schematic wireless mobile device screen shots illustrating control of a variety of different operable window treatments.

FIG. 23 is a schematic screen shot showing a room image 320 displayed on the touch screen 29 of the wireless mobile device 20. The room image 320 includes a window 322 and drapes 324 that are disposed relative to the window 322 such that the drapes 324 may be moved to one side to cover the window 322 and may be moved to another side (as shown) to expose the window 322. The drapes 324 include a hanging rod 326 and a mechanism schematically shown as block 328 that may be used to move the drapes 324. In some cases, a cable or other element may extend through an interior of the hanging rod 326 such that activation of a motor within the mechanism 328 causes the drapery panels to slide to the left or to the right. In some cases, the drapes 324 include hooks 330 that slide along the hanging rod 326. The room image 320 includes a DRAPES icon 332 that may be touched by a user to bring up controls for moving the drapes 324.

Figure 24A:
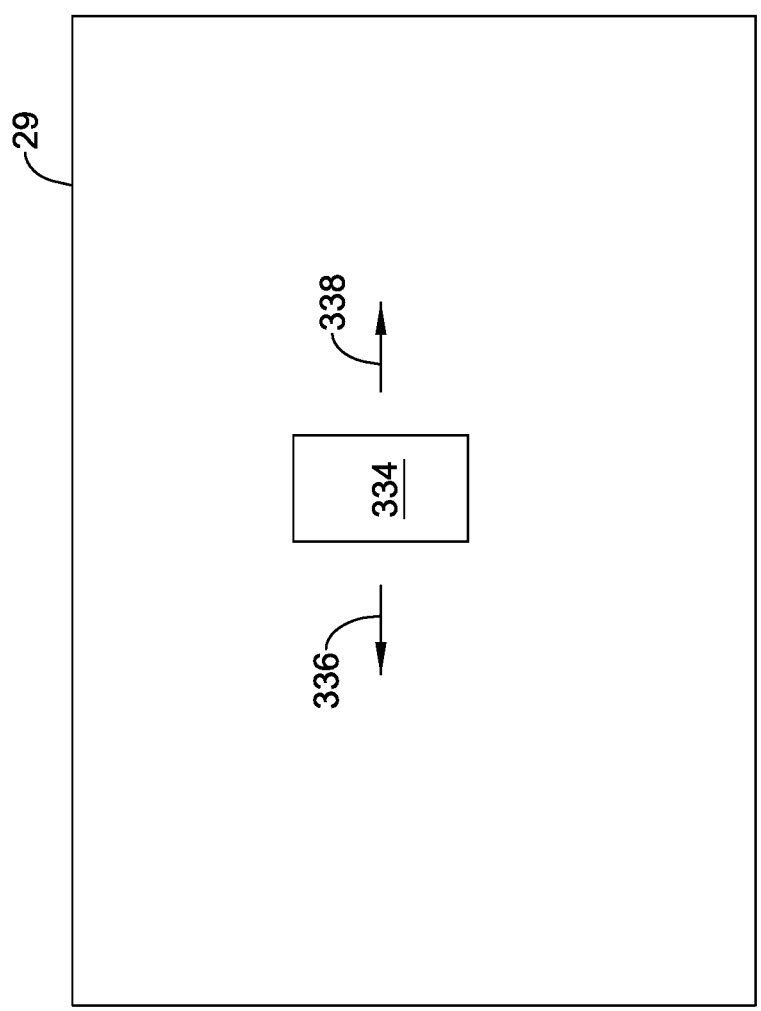
Figure 24B:
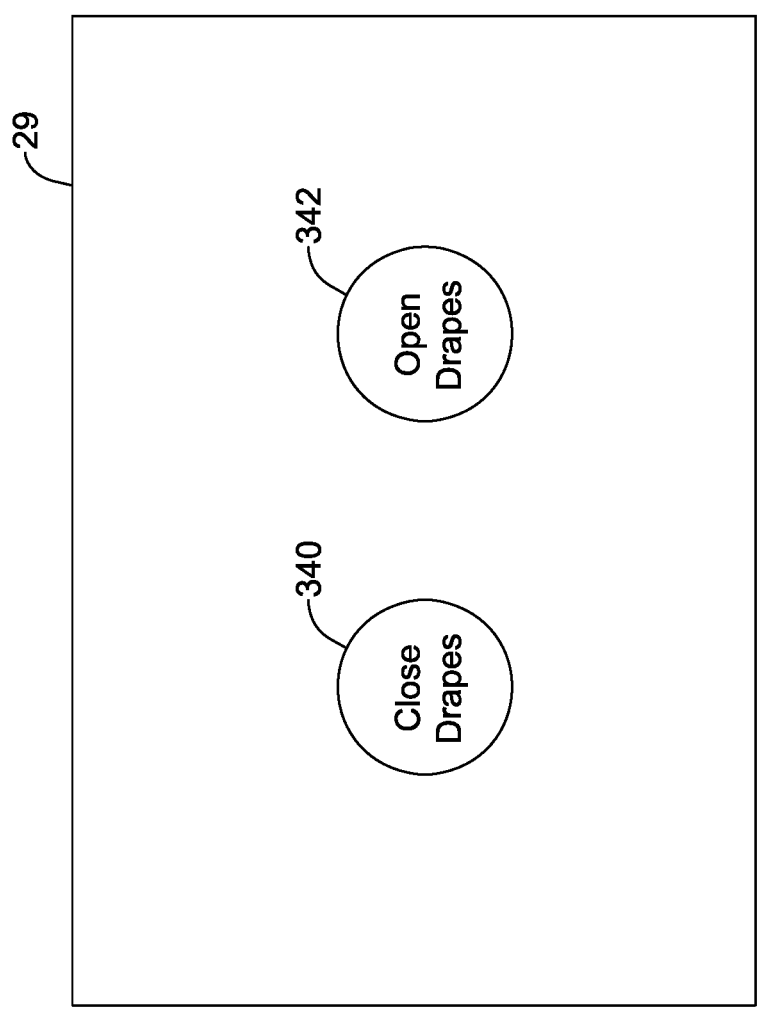

Touching the DRAPES icon 332 may cause the wireless mobile device 20 to display a drapes actuation icon 334, as shown in FIG. 24A. The drapes actuation icon 332 may be dragged to one side to either open or close the drapes 324, depending on which side of the window 322 the drapes 324 are located, indicated by an arrow 336, and may be dragged to the other side to either close or open the drapes 324 (opposite action to that which occurs when dragging in the first direction. In some cases, simply pressing and holding the drapes actuation icon 334 may cause the wireless mobile device 20 to display a CLOSE DRAPES icon 340 and an OPEN DRAPES icon 342, as shown in FIG. 24B. Thus, rather than dragging an icon, the user may simply press one of the icons 340, 342, as desired. In some cases, a number of preset drape positions may be set by the installer and/or user. When so provided, in addition to the CLOSE DRAPE icon 340 and the OPEN DRAPES icon 342, a number of intermediate drape icons may be provided, such as a one-quarter OPEN icon, a one-half OPEN icon and/or a three-quarter OPEN icon. These are just examples. In some cases, the installer and/or user may position the draped in a desired position, and then store that position as a preset drape position.

Figure 25:
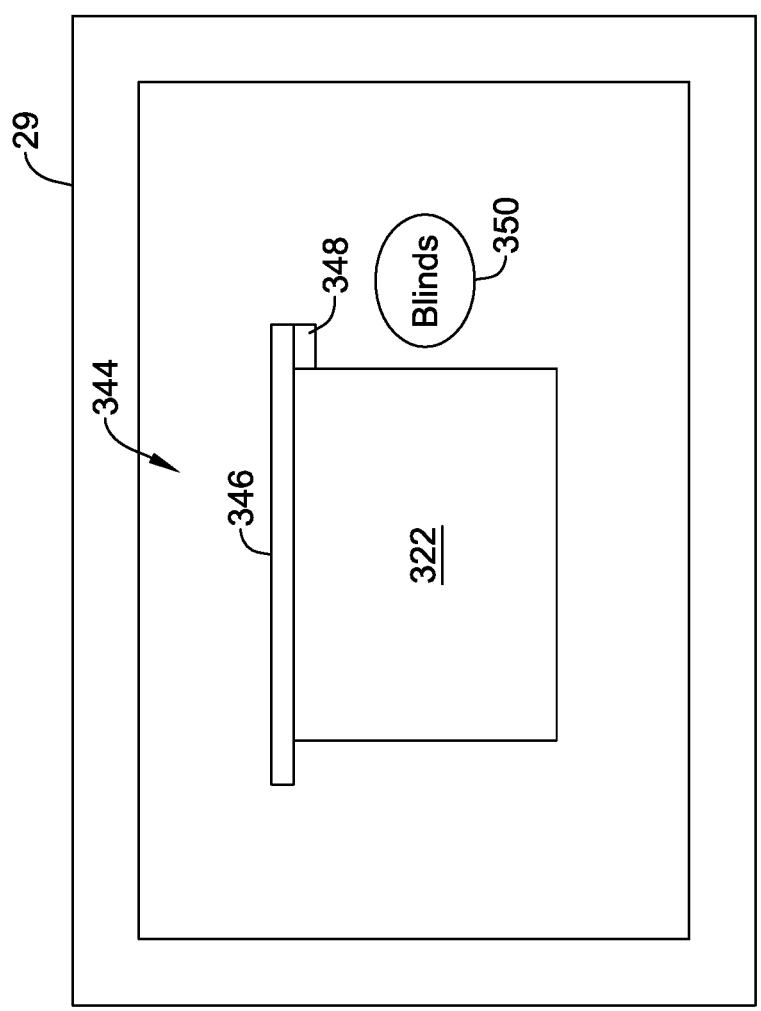

FIG. 25 is a schematic screen shot showing a room image 344 displayed on the touch screen 29 of the wireless mobile device 20. The room image 344 includes blinds 346 that are disposed above the window 322. The blinds 346 may have an upper portion that remains stationary and a lower portion that moves up and down to either cover or expose the window 322. In some cases, the blinds 346 may be top-down, bottom-up blinds in which the upper portion and the lower portion independently move up and down. The blinds 346 include a mechanism schematically shown as a block 348 that may be used to actuate the blinds 346. The room image 344 includes a BLINDS icon 350 that may be touched by a user to bring up controls for moving the blinds 346.

Figure 26A:
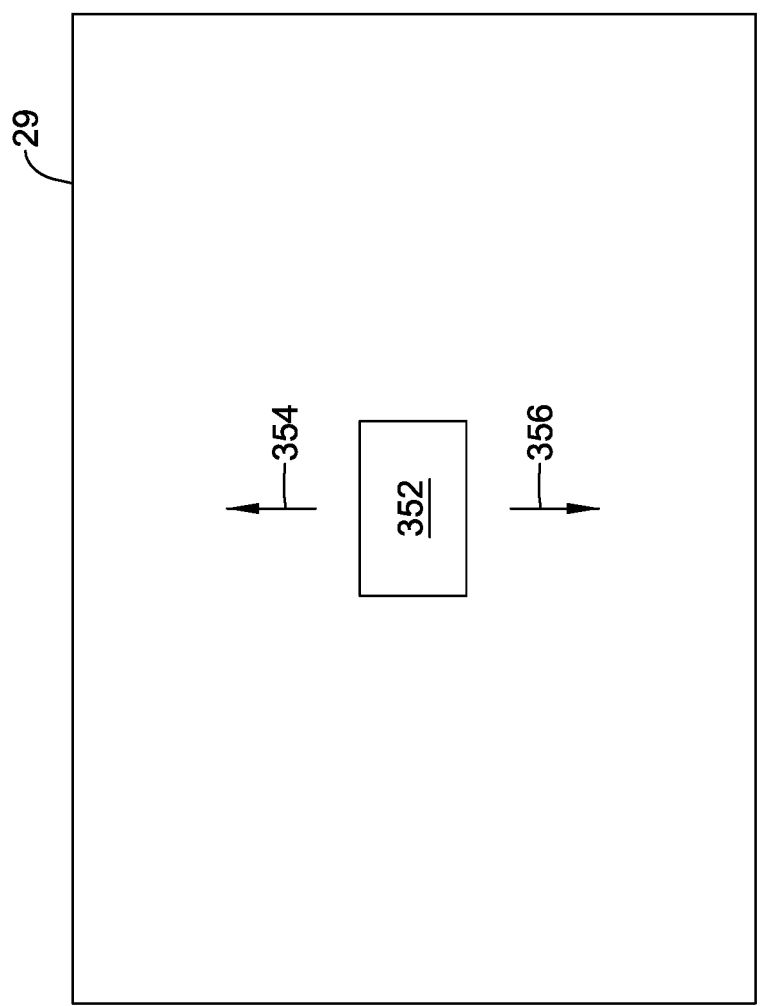
Figure 26B:
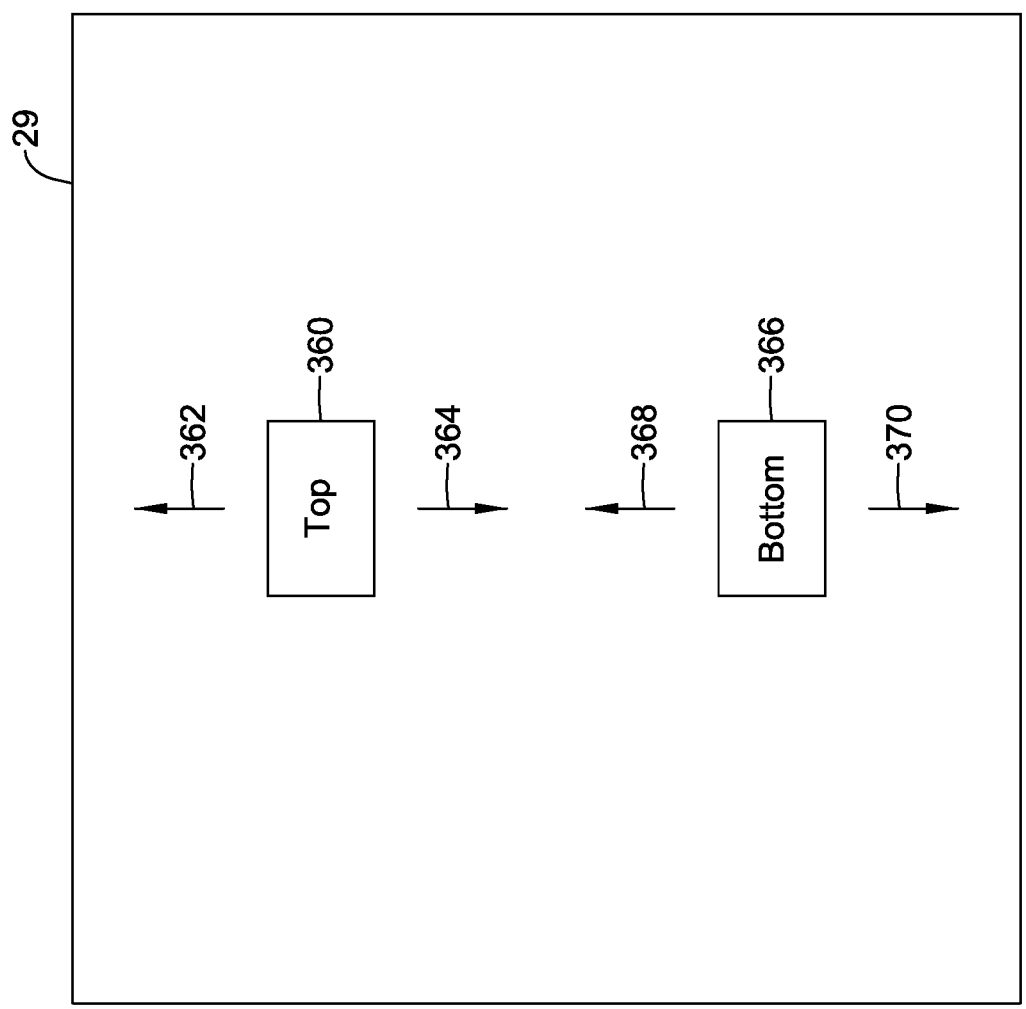

In cases where the blinds 344 have a stationary upper portion and a moveable lower portion, touching the BLINDS icon 350 may cause the wireless mobile device 20 to display a blinds actuation icon 352, as shown in FIG. 26A. The blinds actuation icon 352 may be moved up, as indicated by an arrow 354, in order to raise the lower portion of the blinds, and may be moved down, as indicated by an arrow 356, in order to lower the lower portion of the blinds. Alternatively, if the blinds 346 are top-down, bottom-up blinds, touching the BLINDS icon 350 may cause the wireless mobile device 20 to display a top actuation icon 360 and a bottom actuation icon 366, as shown in FIG. 26B. The upper portion of the blinds 344 may be moved up or down by dragging the top actuation icon 360 in a direction indicated by an arrow 362 or an arrow 364, respectively. The lower portion of the blinds 346 may be moved up or down by dragging the bottom actuation icon 366 in a direction indicated by an arrow 368 or an arrow 370, respectively.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A non-transitory, computer-readable medium including instructions that, when executed, cause one or more processors to:

receive image data corresponding to a photograph of a room, wherein the image data represents a view of the room from a perspective within the room;

output, for display by a user interface of a user device, the photograph, wherein the user interface displays the photograph in a first area of the user interface;

output, for display by the user interface of the user device, a set of icons, wherein the user interface displays the set of icons in a second area of the user interface separate from the first area of the user interface, wherein each icon of the set of icons corresponds to a respective building control device of a set of building control devices, and wherein the perspective view of the room shown in the photograph includes at least one building control device of the set of building control devices;

receive, from the user interface of the user device, one or more commands to move one or more icons of the set of icons from the second area of the user interface to the first area of the user interface, wherein each command of the one or more commands comprises a command to move a respective icon of the one or more icons to a respective location on the photograph that includes a corresponding building control device of the set of building control devices such that the respective icon of the set of icons identifies the corresponding building control device of the set of building control devices;

receive, from the user interface, one or more commands to set operating parameters for one or more building control devices corresponding to the one or more icons, wherein the one or more commands to set operating parameters include a set of user selections, and wherein each user selection of the set of user selections comprises a user selection of one or more operating parameters for a building control device of the one or more building control devices corresponding to a respective icon of the one or more icons;

set the operating parameters for the one or more building control devices based on the one or more commands to set operating parameters;

receive a request to create a custom mood setting based on present operating parameters for each building control device of the one or more building control devices and a custom mood setting name, the present operating parameters being set based on the set of user selections;

create the custom mood setting by associating the present operating parameters for each building control device of the one or more building control devices with the custom mood setting name;

add the custom mood setting to a set of mood settings;

output, for display in the second area of the user interface, the set of mood settings;

receive a user selection of a mood setting of the set of mood settings;

control the set of building control devices based on one or more operating parameters associated with the selected mood setting; and configure each building control device of the one or more building control devices based on the one or more commands to set operating parameters.

2. The non-transitory, computer-readable medium of claim 1, wherein to receive the one or more commands to move the one or more icons of the set of icons, the instructions cause the one or more processors to receive one or more drag and drop maneuvers to move the icon.

3. The non-transitory, computer-readable medium of claim 1, wherein the instructions further cause the one or more processors to zoom in on the photograph output for display by the user interface in response to receiving, from the user interface, information indicative of a pinch gesture on the photograph.

4. The non-transitory, computer-readable medium of claim 1, wherein the instructions further cause the one or more processors to zoom out on the photograph output for display by the user interface in response to receiving, from the user interface, information indicative of a spread gesture on the photograph.

5. The non-transitory, computer-readable medium of claim 1, wherein the instructions further cause the one or more processors to zoom the photograph output for display by the user interface to a predetermined zoom level in response to receiving, from the user interface, information indicative of a double tap gesture on the photograph.

6. The non-transitory, computer-readable medium of claim 1, wherein the set of building control devices comprise one or more devices that are connected to a sub-network assigned to the room.

7. The non-transitory, computer-readable medium of claim 1, wherein the set of building control devices comprise one or more devices that are configured to communicate with a sub-network assigned to the room.

8. The non-transitory, computer-readable medium of claim 1, wherein the set of building control devices including any one or combination of lighting devices, security devices, music devices, heating, cooling or ventilation devices, and adjustable window treatments.

9. The non-transitory, computer-readable medium of claim 1, wherein the instructions further cause the one or more processors to display one or more screens on the user interface such that the user interface is configured to receive operational parameters for at least one of the set of building control devices which correspond to the one or more icons of the set of icons.

10. The non-transitory, computer-readable medium of claim 9, wherein the instructions further cause the one or more processors to allow the user to test the at least one of the set of building control devices after entering one or more operational parameters.

11. A method comprising:

receiving, by processing circuitry, image data corresponding to a photograph of a room, wherein the image data represents a view of the room from a perspective within the room;

outputting, by the processing circuitry for display by a user interface of a user device, the photograph, wherein the user interface displays the photograph in a first area of the user interface;

outputting, by the processing circuitry for display by the user interface of the user device, a set of icons, wherein the user interface displays the set of icons in a second area of the user interface separate from the first area of the user interface, wherein each icon of the set of icons corresponds to a respective building control device of a set of building control devices, and wherein the perspective view of the room shown in the photograph includes at least one building control device of the set of building control devices;

receiving, by the processing circuitry from the user interface of the user device, one or more commands to move one or more icons of the set of icons from the second area of the user interface to the first area of the user interface, wherein each command of the one or more commands comprises a command to move a respective icon of the one or more icons to a respective location on the photograph that includes a corresponding building control device of the set of building control devices such that the respective icon of the set of icons identifies the corresponding building control device of the set of building control devices;

receiving, by the processing circuitry from the user interface, one or more commands to set operating parameters for one or more building control devices corresponding to the one or more icons, wherein the one or more commands to set operating parameters include a set of user selections, and wherein each user selection of the set of user selections comprises a user selection of one or more operating parameters for a building control device of the one or more building control devices corresponding to a respective icon of the one or more icons;

setting, by the processing circuitry, the operating parameters for the one or more building control devices based on the one or more commands to set operating parameters;

receiving, by the processing circuitry, a request to create a custom mood setting based on present operating parameters for each building control device of the one or more building control devices and a custom mood setting name, the present operating parameters being set based on the set of user selections;

creating, by the processing circuitry, the custom mood setting by associating the present operating parameters for each building control device of the one or more building control devices with the custom mood setting name;

adding, by the processing circuitry, the custom mood setting to a set of mood settings;

outputting, by the processing circuitry for display in the second area of the user interface, the set of mood settings;

receiving, by the processing circuitry, a user selection of a mood setting of the set of mood settings;

controlling, by the processing circuitry, the set of building control devices based on one or more operating parameters associated with the selected mood setting; and configuring, by the processing circuitry, each building control device of the one or more building control devices based on the one or more commands to set operating parameters.

12. A system comprising:

a building controller configured to communicate with a set of building control devices; and processing circuitry configured to:
receive image data corresponding to a photograph of a room, wherein the image data represents a view of the room from a perspective within the room;
output, for display by a user interface of a user device, the photograph, wherein the user interface displays the photograph in a first area of the user interface;
output, for display by the user interface of the user device, a set of icons, wherein the user interface displays the set of icons in a second area of the user interface separate from the first area of the user interface, wherein each icon of the set of icons corresponds to a respective building control device of the set of building control devices, and wherein the perspective view of the room shown in the photograph includes at least one building control device of the set of building control devices;
receive, from the user interface of the user device, one or more commands to move one or more icons of the set of icons from the second area of the user interface to the first area of the user interface, wherein each command of the one or more commands comprises a command to move a respective icon of the one or more icons to a respective location on the photograph that includes a corresponding building control device of the set of building control devices such that the respective icon of the set of icons identifies the corresponding building control device of the set of building control devices;
receive, from the user interface, one or more commands to set operating parameters for one or more building control devices corresponding to the one or more icons, wherein the one or more commands to set operating parameters include a set of user selections, and wherein each user selection of the set of user selections comprises a user selection of one or more operating parameters for a building control device of the one or more building control devices corresponding to a respective icon of the one or more icons;
set the operating parameters for the one or more building control devices based on the one or more commands to set operating parameters;
receive a request to create a custom mood setting based on present operating parameters for each building control device of the one or more building control devices and a custom mood setting name, the present operating parameters being set based on the set of user selections;
create the custom mood setting by associating the present operating parameters for each building control device of the one or more building control devices with the custom mood setting name;
add the custom mood setting to a set of mood settings;
output, for display in the second area of the user interface, the set of mood settings;
receive a user selection of a mood setting of the set of mood settings;
control the set of building control devices based on one or more operating parameters associated with the selected mood setting; and
configure each building control device of the one or more building control devices based on the one or more commands to set operating parameters.

13. The system of claim 12, wherein to receive the one or more commands to move the one or more icons of the set of icons, the processing circuitry is configured to receive one or more drag and drop maneuvers to move the icon.

14. The system of claim 12, wherein the processing circuitry is further configured to zoom in on the photograph output for display by the user interface in response to receiving, from the user interface, information indicative of a pinch gesture on the photograph.

15. The system of claim 12, wherein the processing circuitry is further configured to zoom out on the photograph output for display by the user interface in response to receiving, from the user interface, information indicative of a spread gesture on the photograph.

16. The system of claim 12, wherein the processing circuitry is further configured to zoom the photograph output for display by the user interface to a predetermined zoom level in response to receiving, from the user interface, information indicative of a double tap gesture on the photograph.

17. The system of claim 12, wherein the set of building control devices comprise one or more devices that are connected to a sub-network assigned to the room.

18. The system of claim 12, wherein the set of building control devices comprise one or more devices that are configured to communicate with a sub-network assigned to the room.

19. The system of claim 12, wherein the set of building control devices including any one or combination of lighting devices, security devices, music devices, heating, cooling or ventilation devices, and adjustable window treatments.

20. The system of claim 12, wherein the processing circuitry is further configured to display one or more screens on the user interface such that the user interface is configured to receive operational parameters for at least one of the set of building control devices which correspond to the one or more icons of the set of icons.

* * * * *